(12) United States Patent
Hwang et al.

(10) Patent No.: US 7,526,287 B2
(45) Date of Patent: Apr. 28, 2009

(54) CIPHERING METHOD IN A MOBILE COMMUNICATION SYSTEM SUPPORTING A MULTIMEDIA BROADCAST/MULTICAST SERVICE

(75) Inventors: Sung-Oh Hwang, Yongin-si (KR);
Kook-Heui Lee, Yongin-si (KR);
Sung-Ho Choi, Suwon-si (KR);
Eun-Jung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 10/909,890

(22) Filed: Aug. 2, 2004

(65) Prior Publication Data

US 2005/0026607 A1 Feb. 3, 2005

(30) Foreign Application Priority Data

Aug. 2, 2003 (KR) .................. 10-2003-0053620

(51) Int. Cl.
*H04Q 7/20* (2006.01)
(52) U.S. Cl. ................ 455/422.1; 455/3.01; 455/435.1; 455/435.2; 455/451; 455/452.1; 370/310.1; 370/322; 370/328; 370/329
(58) Field of Classification Search ................ 455/3.01, 455/3.06, 410–411, 550.1, 517, 179.1, 422.1, 455/435.1, 451, 452.1; 713/150, 162, 170–171; 380/270, 273, 277–279, 259, 281; 370/310.1, 370/322, 328, 329
See application file for complete search history.

(56) References Cited

U.S. PATENT DOCUMENTS

| | | | | |
|---|---|---|---|---|
| 5,528,691 A | * | 6/1996 | Rosauer et al. | 380/273 |
| 5,966,449 A | * | 10/1999 | Iwamura et al. | 380/44 |
| 5,991,405 A | * | 11/1999 | Mills | 380/247 |
| 5,991,407 A | * | 11/1999 | Murto | 380/248 |
| 6,069,957 A | * | 5/2000 | Richards | 380/281 |
| 6,137,885 A | | 10/2000 | Totaro et al. | 380/247 |
| 6,813,357 B1 | * | 11/2004 | Matsuzaki et al. | 380/279 |
| 6,832,314 B1 | * | 12/2004 | Irvin | 713/162 |
| 6,985,591 B2 | * | 1/2006 | Graunke | 380/277 |
| 7,177,658 B2 | * | 2/2007 | Willenegger et al. | 455/522 |
| 2003/0002675 A1 | * | 1/2003 | Graunke | 380/259 |
| 2003/0035543 A1 | * | 2/2003 | Gillon et al. | 380/270 |
| 2003/0039361 A1 | * | 2/2003 | Hawkes et al. | 380/278 |
| 2003/0134653 A1 | * | 7/2003 | Sarkkinen et al. | 455/517 |
| 2004/0198279 A1 | * | 10/2004 | Anttila et al. | 455/179.1 |
| 2005/0008159 A1 | * | 1/2005 | Grilli et al. | 380/270 |
| 2005/0010774 A1 | * | 1/2005 | Rose et al. | 713/171 |
| 2005/0015583 A1 | * | 1/2005 | Sarkkinen et al. | 713/150 |
| 2005/0138379 A1 | * | 6/2005 | Semple et al. | 713/170 |

* cited by examiner

*Primary Examiner*—Stephen M D'Agosta
(74) *Attorney, Agent, or Firm*—The Farrell Law Firm, PC

(57) ABSTRACT

A method for ciphering MBMS (Multimedia Broadcast/Multicast Service) data in a wired/wireless communication system is provided. The MBMS service enables the same service or desired services to be provided to a number of users. In the ciphering method, a ciphering key for encoding MBMS data is previously provided to an authorized UE, and the authorized UE is informed of when MBMS data encoded using the ciphering key is to be transmitted, thereby preventing unauthorized UEs from illegally receiving the MBMS service.

19 Claims, 14 Drawing Sheets

CIPHERING METHOD IN A MOBILE COMMUNICATION SYSTEM SUPPORTING A MULTIMEDIA BROADCAST/MULTICAST SERVICE

PRIORITY

This application claims priority to an application entitled "CIPHERING METHOD IN MOBILE COMMUNICATION SYSTEM SUPPORTING MULTIMEDIA BROADCAST/MULTICAST SERVICE", filed in the Korean Intellectual Property Office on Aug. 2, 2003 and assigned Serial No. 2003-53620, the contents of which are incorporated herein by reference.

BACKGROUND OF THE INVENTION

1. Field of the Invention

The present invention relates generally to a ciphering method in a mobile communication system supporting a Multimedia Broadcast/Multicast Service (MBMS), and more particularly to a method for notifying UEs of a start time for using ciphering parameters.

2. Description of the Related Art

In the mobile communication industry, the current trend is to provide a packet service (i.e., a multicast multimedia communication service) for transmitting a large amount of packet or circuit data as well as voice communication data. A Broadcast/Multicast Service for providing services from at least one multimedia data source to a number of UEs is under development to support the multicast multimedia communication service. The broadcast/multicast service can be classified into a Cell Broadcast Service (CBS), which is a message-based service, and a Multimedia Broadcast/Multicast Service (MBMS), which supports multimedia formats such as real-time images and audio, still images, and text data.

The CBS service broadcasts messages to all UEs located in a specific service area, which is, for example, the entire area in a cell where the CBS service is provided.

The MBMS service supports multimedia formats such as real-time images and audio, still images, and text data at the same time, and thus, requires a large amount of transmission resources. The MBMS service is provided through a broadcast channel because a large amount of service may be simultaneously provided in a single cell. In particular, the MBMS service requires a larger amount of radio resources than the CBS service.

The MBMS service can be provided in a Point-to-Point (PtP) mode or in a Point-to-Multipoint (PtM) mode according to the number of UEs intending to receive the MBMS service in a cell or according to transmission power used for the MBMS service. The PtP mode provides a desired MBMS service to each UE over a dedicated channel assigned thereto when there are a small number of UEs desiring the MBMS service or when there is sufficient remaining transmission power. The PtM mode provides desired MBMS services to UEs over a common channel assigned thereto when there are a large number of UEs desiring the MBMS service or when there is insufficient remaining transmission power. Of course, when the MBMS service is being provided in the PtP mode, the service mode can be switched to the PtM mode on a cell-by-cell basis or when the MBMS service is being provided in the PtM mode, the service mode can be switched to the PtP mode on a cell-by-cell basis. This mode switching is performed only when there is a change in an environment providing the MBMS service.

FIG. 1 is a block diagram illustrating an example of a mobile communication network supporting MBMS services when the network is applied to an asynchronous mobile communication system. In FIG. 1, a Broadcast/Multicast-Service Center (BM-SC) 106 is a source that provides MBMS streams. The BM-SC 106 schedules and transfers MBMS streams to a Gateway GPRS (General Packet Radio Service) Support Node (GGSN) 105. The GGSN 105 transfers the MBMS streams received from the BM-SC 106 to a Serving GPRS Support Node (SGSN) 103. The SGSN 103 is included in a Core Network (CN) and connects the CN with a Universal Mobile Telecommunications System (UMTS) Terrestrial Radio Access Network (UTRAN) 102. The SGSN 103 receives the MBMS stream from the GGSN 105, and performs control associated with MBMS services for subscribers that desire to receive the MBMS services.

For example, the SGSN 103 manages MBMS service charging data of each subscriber or selectively transmits MBMS streams to a specific Radio Network Controller (RNC) in the UTRAN. The SGSN 103 also includes and manages an SGSN service context for MBMS services. The service context for MBMS services is a set of control information items required to provide the MBMS services. A Home Location Register (HLR) 104 is connected with the SGSN 103 to perform subscriber authentication for MBMS services.

As illustrated in FIG. 2, a User Equipment (UE) 101 is connected with the UTRAN 102 through a Uu interface 121, which is a term used in 3GPP to describe an interface between the UE and the UTRAN. The UTRAN 102 is connected with the SGSN 103 that is included in the CN via an Iu interface 122 illustrated in FIG. 2, which is a term used in 3GPP to describe an interface between the UTRAN and the components of the CN.

Table 1 below describes the role of each MBMS component illustrated in FIG. 1.

TABLE 1

| MBMS Components | Roles |
|---|---|
| UE | To receive MBMS data allowing user to use the service at any time. |
| UTRAN | To transfer MBMS data to UE and transfer MBMS request of UE to CN. |
| SGSN | To authenticate UE requesting MBMS service based on data received from HLR, and authenticate the right to use requested MBMS service based on data received from HLR. |
| | To establish Radio Access Bearer (RAB) for MBMS service requested by UE. |
| | To support MBMS services also when UE moves between cells and provide connection with MBMS source via GGSN. |
| | To collect charging information of MBMS service used by UE. |

TABLE 1-continued

| MBMS Components | Roles |
| --- | --- |
| HLR | To manage information for authentication of each UE and information of MBMS service types usable by each UE |
| GGSN | To receive MBMS data to be provided to UE directly from Multicast/Broadcast source through BM-SC and BG and transmit received MBMS data to SGSN. To collect charging information of UE, manage movement states of each UE, and manage QoS of MBMS service provided to UE. |
| BM-SC | To authenticate content provider, determine QoS of MBMS service, correct errors of lost MBMS data, charge content provider, and receive MBMS data from content provider and provide it to GGSN. To inform UE of which MBMS service is currently provided to UE. |
| Multicast/Broadcast source | To provide MBMS data directly to GGSN |
| BG | To receive MBMS data from Multicast/Broadcast source in network not currently managed by service provider |
| Content Provider | To provide MBMS content to BM-SC |
| Multicast/Broadcast source | To provide MBMS data directly to GGSN |

The description of the roles of the MBMS components in Table 1 may differ slightly according to network operators, but their basic roles are the same as in Table 1.

Although not illustrated in FIG. 1, the network may further include a Cell Broadcast Center (CBC) for providing UE with preliminary information about MBMS currently in service.

Table 2 describes the types and roles of interfaces used for the MBMS components illustrated in FIG. 1.

TABLE 2

| Interface types | Roles |
| --- | --- |
| Uu | Interface between UE and UTRAN |
| Iu | Interface between UTRAN and CN |
| Gr | Interface between SGSN and HLR |
| Gn/Gp | Interface between SGSN and GGSN |
| Gi | Interface between GGSN and BMSC |
| Gi | Interface between GGSN and multicast/broadcast source |
| Gi | Interface between GGSN and BG |
| Gn/Gp | Interface between BM-SC and content provider |
| Gi | Interface between BG and multicast/broadcast source |

Although terms defined in 3GPP are used to describe the interfaces in Table 2, different terms may also be used.

The configuration of each component of the communication network supporting MBMS services illustrated in FIG. 1, the configuration of the UTRAN, and protocol and channel structures used in 3GPP will now be described in detail with reference to FIGS. 2 and 3.

Referring to FIG. 2, the UTRAN includes a plurality of Radio Network Systems (RNSs) 110 and 120. The RNSs 110 and 120 include RNCs 111 and 112, Node Bs 115 and 113, and Node Bs 114 and 116, which are controlled by the RNCs 111 and 112, respectively, and a plurality of cells belonging to each of the Node Bs 115, 113, 114, and 116. The RNC 111 or 112 controls the Node Bs 115 and 113 or the Node Bs 114 and 116 and provides an MBMS service to a Node B, where a UE requesting the MBMS service is located, among the Node Bs 115 and 113 or the Node Bs 114 and 116 managed by the RNC 111 or 112. The RNC 111 or 112 also controls a radio channel for providing an MBMS service, and includes and manages an RNC service context for the MBMS service provided by the RNC 111 or 112. The service provider can determine the total number of Node Bs controlled by the RNC 111 or 112 and the total number of cells belonging to each Node B.

FIG. 3 illustrates the protocol architecture of a conventional UTRAN. More specifically, FIG. 3 illustrates a detailed configuration of the higher layer and channels between the layers in the UTRAN currently defined in the asynchronous mobile communication system.

Referring to FIG. 3, messages of the higher layer processed in the UTRAN can be mainly divided into a control signal (i.e., a control plane (C-Plane) signal 301) and user data (i.e., user plane (U-Plane) data 302). The C-Plane signal 301 and the U-Plane data 302 are messages of a Non Access Stratum (NAS). The NAS messages are not used for radio access between the UE and the UTRAN, and thus, the UTRAN does not need to know the information of the NAS messages. Different from the NAS messages, Access Stratum (AS) messages are directly used for radio access between the UE and the UTRAN. More specifically, the AS message is data or at least one control signal used in a Radio Resource Controller (RRC) 303.

The RRC 303 controls a physical layer (L1) 310 associated with connection between the UE and the UTRAN, and also controls sub-layers of Layer 2, such as Medium Access Control (L2/MAC) 308, Radio Link Control (L2/RLC) 306, Packet data Convergence Protocol (L2/PDCP) 304, and Broadcast/Multicast Control (L2/BMC) 305. Through this layer control, the RRC 303 controls all events or operations associated with connection between the UE and the UTRAN, such as physical call establishment, logical call establishment, control information transmission/reception, and measurement data transmission/reception between the UE and the UTRAN.

The L2/PDCP 304 receives data, which will be transmitted, from the NAS layer, and transmits the received data to the L2/RLC 306 using a suitable protocol. The L2/BMC 305 receives data required for broadcast/multicast from the NAS layer, and transmits the received data to the L2/RLC 306 using a suitable protocol.

The L2/RLC 306 receives a control message to be transmitted from the RRC 303 to the UE, and processes the received control message into a format suitable for its characteristics in RLCs #1 to #m 361 to 362. The processed control message is transmitted to the L2/MAC 308 through a logical channel 307. The L2/RLC 306 also receives data from the L2/PDCP 304 and the L2/BMC 305 and processes the received data into a suitable format in RLCs #1' to #n' 363 to 364. The processed data is transmitted to the L2/MAC 308 through the logical channel 307. The number of RLCs produced in the L2/RLC 306 is determined based on the number of radio links existing between the UE and the UTRAN.

The logical channel 307 is mainly classified into a dedicated type for a specific UE or a specific set of UEs, a common type for a plurality of UEs, a control type for transmission of control messages, and a traffic type for transmission of traffic data or messages.

Table 3 describes the types and roles of logical channels used in the asynchronous mobile communication system.

TABLE 3

| Logical channels | Roles |
|---|---|
| BCCH | Used for downlink transmission of UTRAN system control information from the UTRAN to a UE. |
| PCCH | Used for downlink transmission of control information from the UTRAN to a UE when the location of a cell to which the UE belongs is not known. |
| CCCH | Used for transmission of control information between the network and a UE when the UE has no connection channel with the RRC. |
| DCCH | Used for point-to-point transmission of control information between the network and a UE when the UE has a connection channel with the RRC. |
| CTCH | Used for point-to-multipoint data transmission between the network and UEs. |
| DTCH | Used for point-to-point data transmission between the network and a UE. |

In Table 3, "BCCH" stands for Broadcast Control Channel, "PCCH" stands for Paging Control Channel, "CCCH" stands for Common Control Channel, "DCCH" stands for Dedicated Control Channel, "CTCH" stands for Common Traffic Channel, and "DTCH" stands for Dedicated Traffic Channel. Under the control of the RRC 303, the L2/MAC 308 manages radio resources and a connection between the UE and the UTRAN. The L2/MAC 308 also receives logical channels from the L2/RLC 306 and maps the received logical channels to transport channels 309 to transmit them to a physical layer (L1) 310.

Table 4 describes the types and roles of the transport channels 309.

TABLE 4

| Transport Channels | Roles |
|---|---|
| BCH | Mapped to a BCCH to transmit data of the BCCH. |
| PCH | Mapped to a PCCH to transmit data of the PCCH. |
| RACH | Used for transmission of network access and control messages and small-size data from a UE to the network, and can be mapped to DCCH, CCCH and DTCH. |
| FACH | Used for transmission of control messages and data from the network to a specific UE and a specific set of UEs, and can be mapped to BCCH, CTCH, CCCH, DTCH and DCCH. |
| DCH | Used for transmission of data and control signals between the network and a UE, and mapped to DTCH and DCCH. |
| DSCH | A downlink channel from the network to a UE, used for high volume data transmission, and mapped to DTCH and DCCH. |
| HS-DSCH | A downlink channel from the network to a UE, which improves transmission efficiency of DSCH, and mapped to DTCH and DCCH. |

In Table 4, "BCH" stands for Broadcast Channel, "PCH" stands for Paging Channel, "RACH" stands for Random Access Channel, "FACH" stands for Forward Access Channel, "DCH" stands for Dedicated Channel, "DSCH" stands for Downlink Shared Channel, and "HS-DSCH" stands for High Speed DSCH. There are also transport channels such as an Uplink Shared Channel (USCH) and a Common Packet Channel (CPCH) other than the transport channels described in Table 4, but a description thereof is omitted in Table 4 because they are unrelated to the present invention.

Through a suitable procedure, the transport channels transferred to the physical layer (L1) 310 are mapped to actual physical channels and are then transmitted to the UE or UTRAN. The physical channels include a Primary Common Control Physical Channel (P-CCPCH) for transferring the BCH, a Secondary Common Control Physical Channel (S-CCPCH) for transferring the PCH and FACH, a Dedicated Physical Channel (DPCH) for transferring the DCH, a Physical Downlink Shared Channel (PDSCH) for transferring the DSCH, a High Speed Physical Downlink Shared Channel (HS-PDSCH) for transferring the HS-DSCH, and a Physical Random Access Channel (PRACH) for transferring the RACH. Pure physical channels other than the above physical channels, which do not carry higher layer data or control signals, include a Pilot Channel (PCH), a Primary Synchronization Channel (P-SCH), a Secondary Synchronization Channel (S-SCH), a Paging Indicator Channel (PICH), an Acquisition Indicator Channel (AICH), and a Physical Common Packet Channel (PCPCH).

The MBMS service generally provides one or more services to a number of UEs as described above, and thus requires a suitable ciphering method. Ciphering in communication systems protects PtP data transmitted to a subscriber or transmitted from a subscriber to a communication provider, and the ciphering method has been specialized to accomplish this purpose.

The ciphering method generally uses a ciphering algorithm and parameters required for the algorithm. The same ciphering algorithm may provide different ciphering results by using parameters of different values. For cost savings, most communication systems use a small number of ciphering algorithms and a large number of parameters in encoding data transmitted and received by the user.

The conventional ciphering method and the MBMS ciphering method used for MBMS data are similar in that encoded data is transmitted. The two ciphering methods generally use a small number of algorithms, rather than a large number of algorithms, and renew parameters for the algorithms to obtain different ciphering results. However, the two ciphering methods have different data reception ranges. The conventional ciphering method is based on PtP communication, whereas the MBMS ciphering method is based on PtM communication. This difference causes some problems in the MBMS service.

For example, some UEs may attempt to illegally receive the MBMS service by exploiting the fact that the MBMS service is provided to a number of UEs. In addition, some UEs that have subscribed to a specific MBMS service may attempt to receive other MBMS services using a ciphering method used for the specific MBMS service.

Taking into account the similarities and differences, the MBMS ciphering method will have the following requirements as compared to the conventional ciphering method.

First, the MBMS ciphering method requires a method for reliably transmitting parameters for use in a ciphering algorithm to UEs that have subscribed to the MBMS service.

Second, parameters for use in a ciphering algorithm must be renewed at appropriate times to encode MBMS data for an MBMS service such that only authorized UEs can receive the MBMS service at any time.

Third, UEs must be correctly informed of when renewed parameters are to be used so that the UEs can correctly decode MBMS data. In particular, asynchronous mobile communication systems have no method of synchronizing the network with a number of UEs and informing the UEs of when the renewed parameters are to be used. Therefore, there is a need to provide a method suitable for informing the UEs of when the renewed parameters are to be used.

SUMMARY OF TE INVENTION

Therefore, the present invention has been designed in view of the above and other problems and needs, and it is an object of the present invention to provide a method for distributing a ciphering key for use in encoding MBMS data used for an MBMS service.

It is another object of the present invention to provide a method for notifying UEs of a type of a ciphering key for encoding MBMS data and a time to use the ciphering key.

It is a further object of the present invention to provide a method for distributing a ciphering key and notifying UEs of both the type of the ciphering key and the time to use the ciphering key in an asynchronous mobile communication system having no common time shared between the network and a number of UEs.

It is another object of the present invention to provide a method for inserting an indicator into a data frame to notify UEs of a type of a ciphering key and a time to use the ciphering key in an asynchronous mobile communication system.

It is still another object of the present invention to provide a method for using signaling between a core network and an access network to notify UEs of a type of a ciphering key and a time to use the ciphering key in an asynchronous mobile communication system.

It is yet another object of the present invention to provide a method for using signaling between an access network and a UE to notify UEs of a type of a ciphering key and a time to use the ciphering key in an asynchronous mobile communication system.

It is a further object of the present invention to provide a method for efficiently transmitting parameters for use in encoding MBMS data to UEs receiving an MBMS service in a mobile communication system.

It is another object of the present invention to provide a method for distributing a parameter for encoding MBMS data to UEs intending to receive an MBMS service and notifying the UEs of a time to use the distributed parameter in a mobile communication system providing the MBMS service.

It is still another object of the present invention to provide a method for efficiently transmitting renewed parameters for encoding MBMS data to UEs receiving an MBMS service in a mobile communication system.

It is yet another object of the present invention to provide a method for efficiently transmitting information of a time to use parameters for encoding MBMS data to UEs receiving an MBMS service in a mobile communication system.

It is a further object of the present invention to provide a method for efficiently transmitting information of a time to use renewed parameters for encoding MBMS data to UEs receiving an MBMS service in a mobile communication system.

It is another object of the present invention to provide a method for adding an indicator of a time to use renewed parameters or a parameter for encoding MBMS data to the header of an application layer data frame carrying the MBMS data in a mobile communication system.

It is still another object of the present invention to provide a method for adding information of a time to use renewed parameters or a parameter for encoding MBMS data to a message indicating a start of an MBMS service in a mobile communication system.

It is yet another object of the present invention to provide a method for adding information of a time to use renewed parameters or a parameter for encoding MBMS data to a message for use in establishing a channel for carrying the MBMS data.

In accordance with one aspect of the present invention, the above and other objects can be accomplished by a method for transmitting data for a broadcast service from a Core Network (CN) in a mobile communication system including the CN for providing broadcast services, at least one UTRAN connected to the CN and at least one User Equipment (UE) for receiving broadcast services through the UTRAN. The method includes the steps of: transmitting a plurality of ciphering keys generated for encoding data for the broadcast service to the at least one UE; and creating a data frame including data encoded using a ciphering key among the plurality of the ciphering keys, and transmitting a ciphering key indicator of the one ciphering key to the at least one UE by incorporating the ciphering key indicator into header information of the data frame.

In accordance with another aspect of the present invention, there is provided a method for receiving data for a broadcast service by at least one UE in a mobile communication system including a CN for providing broadcast services, at least one UTRAN connected to the CN and the at least one UE for receiving broadcast services through the UTRAN. The method includes the steps of: requesting the broadcast service from the CN; receiving a plurality of ciphering keys for use in encoding data for the broadcast service from the CN in response to the request; checking a ciphering key indicator included in header information of a data frame received for the broadcast service; and decoding data received through the data frame using a ciphering key indicated by the ciphering key indicator among the plurality of ciphering keys.

In accordance with a further aspect of the present invention, there is provided a method for transmitting data for a broadcast service from a CN in a mobile communication system including the CN for providing broadcast services, at least one UTRAN connected to the CN and at least one UE for receiving broadcast services through the UTRAN. The method includes the steps of: transmitting a plurality of ciphering keys generated for encoding data for the broadcast service to the at least one UE; transmitting a ciphering key indicator of a ciphering key for use in encoding the data among the plurality of ciphering keys to the at least one UE through the UTRAN by incorporating the ciphering key indicator into a message indicating that the broadcast service is to be started; and transmitting data for the broadcast service encoded using the ciphering key indicated by the ciphering key indicator to the at least one UE.

In accordance with another aspect of the present invention, there is provided a method for transmitting data for a broadcast service from at least one UTRAN in a mobile communication system including a CN for providing broadcast services, the at least one UTRAN connected to the CN and at least one UE for receiving broadcast services through the UTRAN. The method includes the steps of: receiving a ciphering key indicator of a ciphering key for use in encoding the data through a session start message from the CN; transmitting the ciphering key indicator to the at least one UE by incorporating the ciphering key indicator into a notification message; and transmitting data for the broadcast service encoded using the ciphering key indicated by the ciphering key indicator to the at least one UE.

In accordance with yet another aspect of the present invention, there is provided a method for receiving data for a broadcast service by at least one UE in a mobile communication system including a CN for providing broadcast services, at least one UTRAN connected to the CN and the at least one UE for receiving broadcast services through the UTRAN. The method includes the steps of: requesting the broadcast service from the CN; receiving a plurality of ciphering keys for use in encoding data for the broadcast service from the CN in response to the request; receiving a ciphering key indicator of a ciphering key for use in encoding the data among the plurality of ciphering keys from the UTRAN through a message indicating that the broadcast service is to be started; and decoding data received from the CN using the ciphering key indicated by the ciphering key indicator.

In accordance with a further aspect of the present invention, there is provided a method for transmitting data for a broadcast service from a CN in a mobile communication system including the CN for providing broadcast services, at least one UTRAN connected to the CN and at least one UE for receiving broadcast services through the UTRAN. The method includes the steps of: transmitting a plurality of ciphering keys generated for encoding data for the broadcast service to UEs that have requested the broadcast service; establishing a Radio Access Bearer (RAB) with the UTRAN; transmitting a ciphering key indicator of a ciphering key for use in encoding the data among the plurality of ciphering keys by incorporating the ciphering key indicator into a response message associated with the establishment of the RAB; and transmitting data for the broadcast service encoded using the ciphering key indicated by the ciphering key indicator.

In accordance with another aspect of the present invention, there is provided a method for transmitting data for a broadcast service from at least one UTRAN in a mobile communication system including a CN for providing broadcast services, the at least one UTRAN connected to the CN and at least one UE for receiving broadcast services through the UTRAN. The method includes the steps of: receiving a ciphering key indicator of a ciphering key for use in encoding the data from the CN through a response message associated with establishment of an RAB with the CN; transmitting the ciphering key indicator to the at least one UE by incorporating the ciphering key indicator into a Radio Bearer (RB) setup request message; and transmitting the data encoded using the ciphering key indicated by the ciphering key indicator to the at least one UE.

In accordance with yet another aspect of the present invention, there is provided a method for receiving data for a broadcast service by at least one UE in a mobile communication system including a CN for providing broadcast services, at least one UTRAN connected to the CN and the at least one UE for receiving broadcast services through the UTRAN. The method includes the steps of: transmitting a broadcast service request message to the CN; receiving a plurality of ciphering keys for use in encoding the data from the CN through a broadcast service response message; receiving a ciphering key indicator of a ciphering key for use in encoding the data among the plurality of ciphering keys from the UTRAN through an RB setup request message; setting up an RB with the UTRAN; and decoding data received through the UTRAN from the CN using a ciphering key indicated by the ciphering key indicator.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
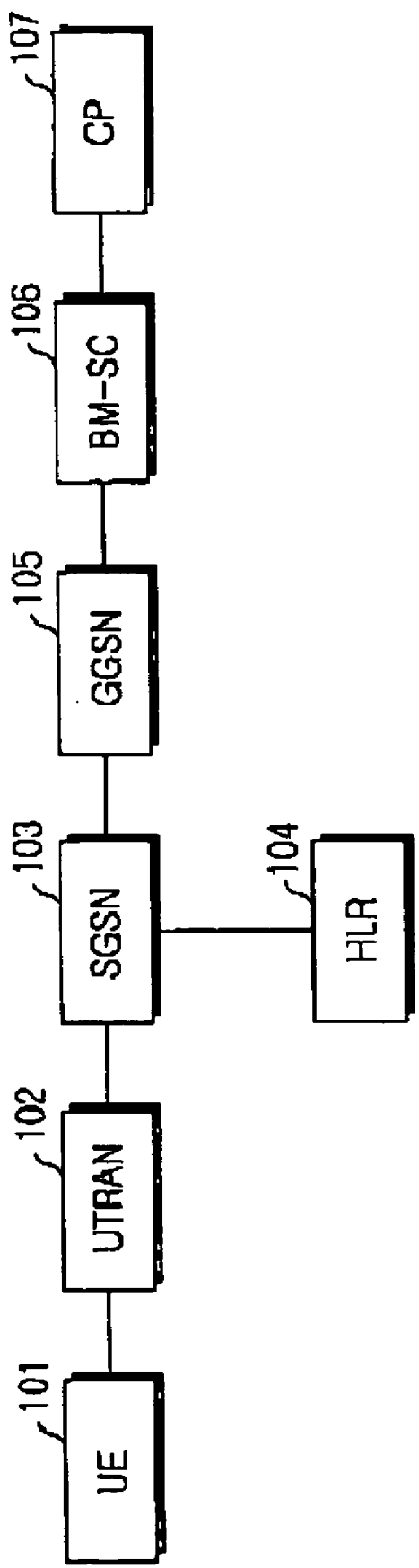
FIG. 1 is a block diagram illustrating a mobile communication network supporting MBMS services.
Figure 2:
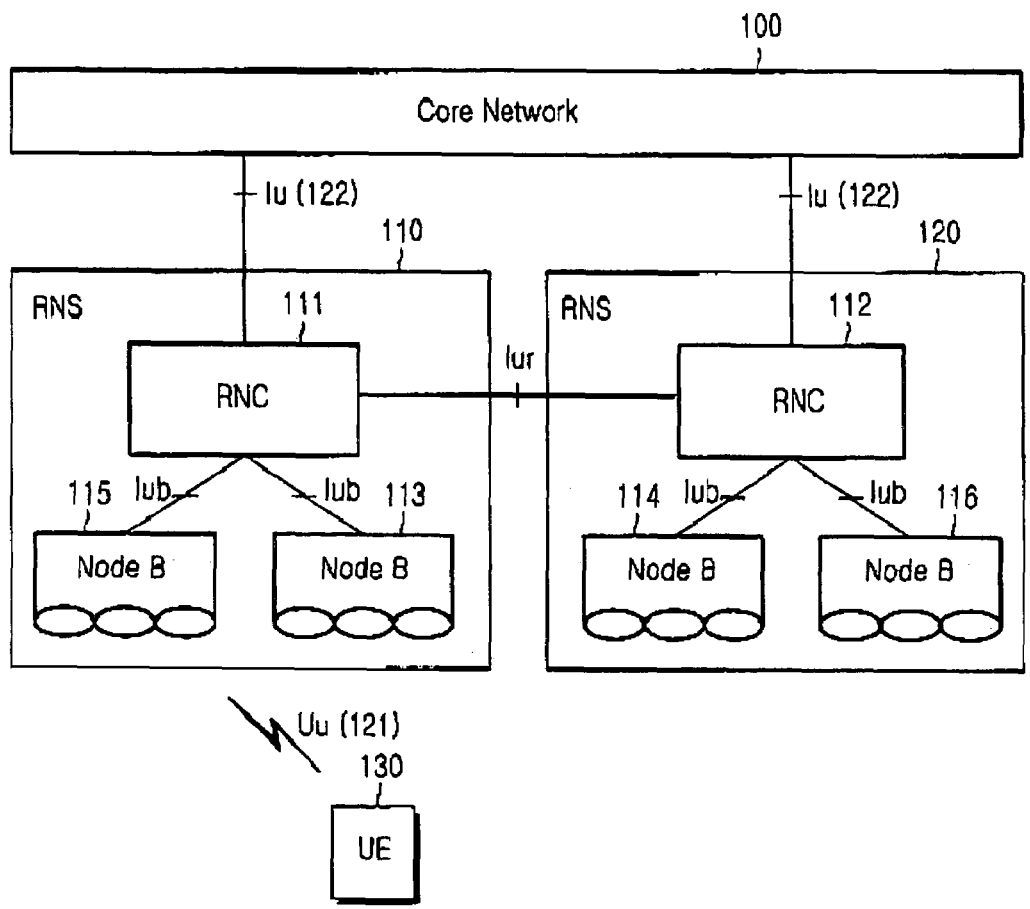
FIG. 2 is a block diagram illustrating a configuration of the RAN illustrated in FIG. 1.
Figure 3:
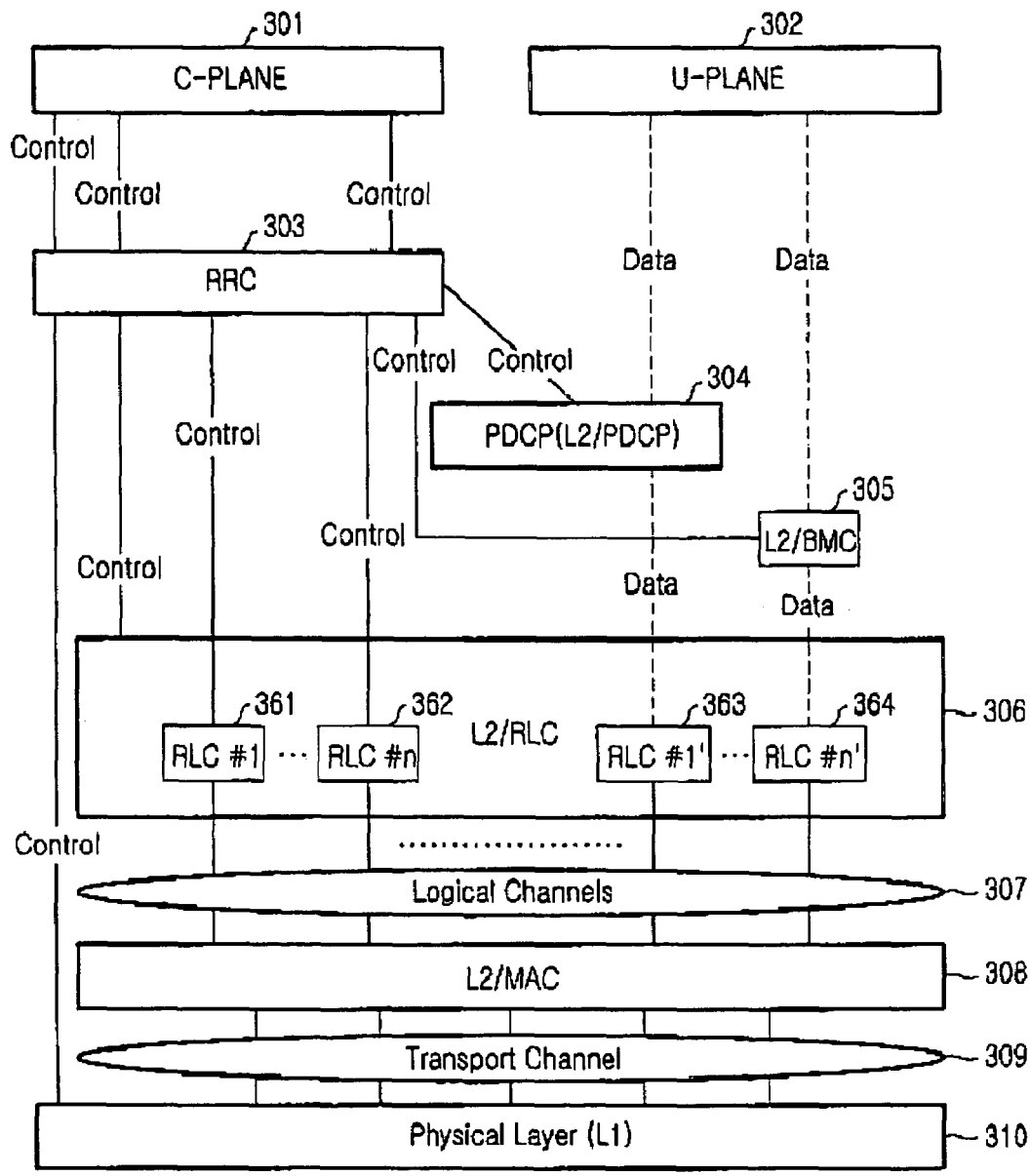
FIG. 3 illustrates a protocol architecture of a conventional UTRAN.

Preferred embodiments of the present invention will be described in detail herein below with reference to the annexed drawings. The following description will be given of exemplary embodiments of the present invention when applied to an asynchronous mobile communication system based on the 3GPP specifications. In the drawings, the same or similar elements are denoted by the same reference numerals even though they are depicted in different drawings.

Additionally, in the following description, a detailed description of known functions and configurations incorporated herein will be omitted when it may make the subject matter of the present invention rather unclear. Also, the terms used in the following description are terms defined taking into consideration the functions obtained in accordance with the present invention. The definitions of these terms should be determined based on the entire contents of this specification because it may be changed in accordance with the option of a user or chip designer or a usual practice.

In the following description, the present invention proposes methods for distributing parameters for encoding MBMS data to be transmitted for each MBMS service to UEs and for notifying the UEs of when use of the parameters for each MBMS service. Each operation of a CN, an RNC, and a UE and signaling procedures there between will be described in detail to support this proposition.

More specifically, the present invention proposes three embodiments of a method for notifying UEs of a time to start using parameters distributed for each MBMS service. The first embodiment is characterized in that a data frame carrying MBMS data for an MBMS service includes index information of parameters to be used. For example, the index information can be transmitted as header information of the data frame. Maintenance index information requesting maintenance of a previous parameter and renewal index information requesting a change to a new parameter must be defined as such index information. A number of UEs, which are receiving an MBMS service, can check index information in the header of a received data frame to decode data received through the data frame using an existing or new parameter. This enables all the UEs to synchronize a start time for using a specific parameter to decode MBMS data.

The second embodiment is characterized in that a message notifying UEs of the start of an MBMS service includes index information of a parameter to be used. Some examples of the message notifying UEs of the start of an MBMS service include a session start message and an MBMS notification message. Maintenance index information for requesting maintenance of a previous parameter and renewal index information for requesting a change to a new parameter must be defined as such index information. A number of UEs, which are receiving an MBMS service, can check index information received through a notification message of each session for providing a desired MBMS service and decode MBMS data using an existing or new parameter according to the checked index information. This enables all the UEs desiring to receive the MBMS service to synchronize a start time for using a specific parameter to decode the MBMS data.

The third embodiment is characterized in that an information element indicating a ciphering key used in encoding MBMS data is added to a message exchanged for establishing an MBMS RAB and a message exchanged for setting up an MBMS RB.

In the following description, it is assumed that parameters are generated by a BM-SC and that parameters for each MBMS service are transmitted from the BM-SC to an SGSN. Additionally, it is assumed that the SGSN transmits parameters to a UE through dedicated signaling (or point-to-point (PtP) signaling).

1. Signaling Procedure

Figure 4:
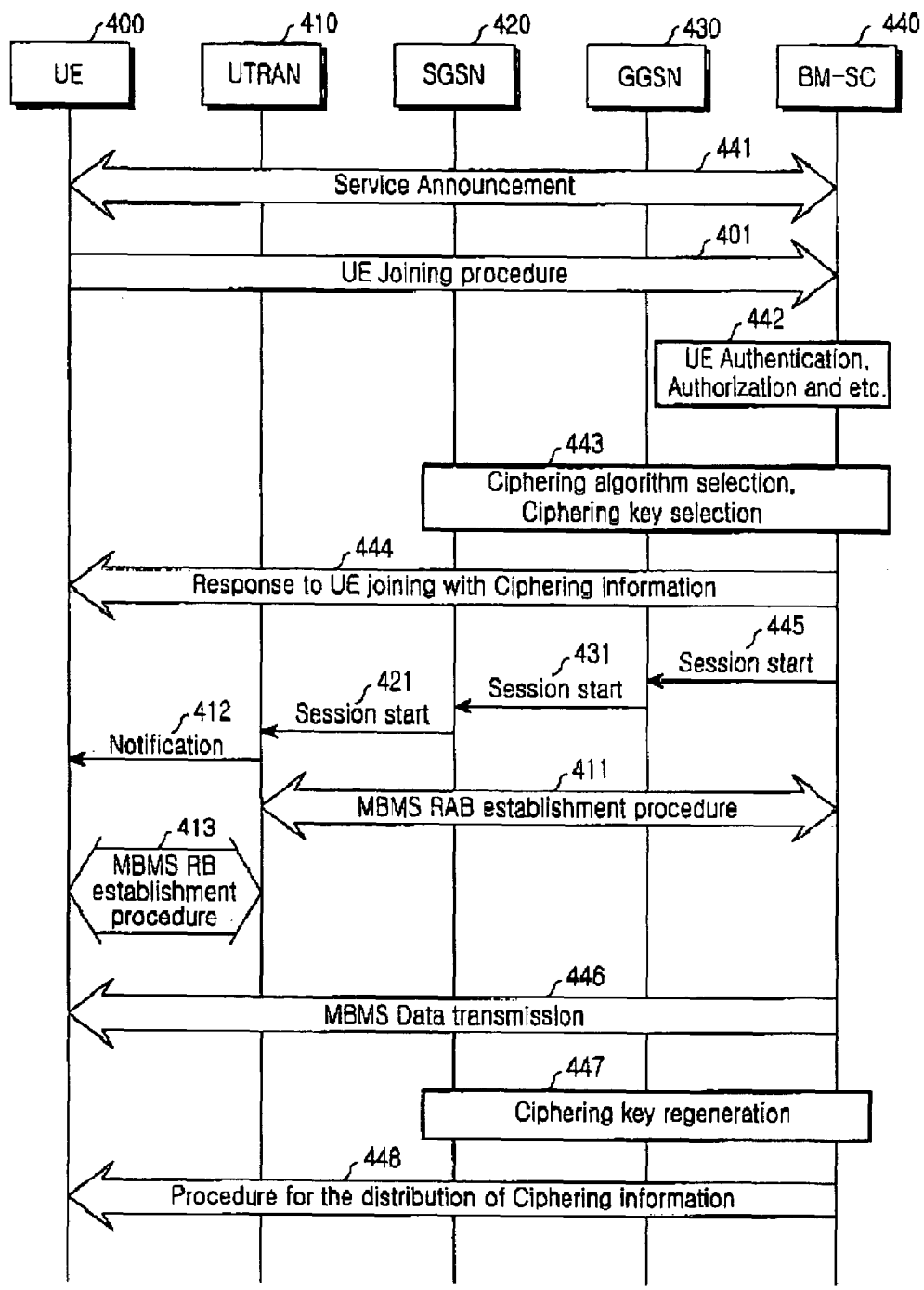
FIG. 4 is a process flow diagram illustrating a procedure for signaling in a mobile communication system according to an embodiment of the present invention.

FIG. 4 is a process flow diagram illustrating a procedure for signaling in a mobile communication system according to an embodiment of the present invention. More specifically, FIG. 4 illustrates signaling between a UE 400, a UTRAN 410, and a CN, which includes an SGSN 420, a GGSN 430, and a BM-SC 440, for distributing a parameter, i.e., a ciphering key, which is to be used in a ciphering algorithm, to a plurality of UEs that receive an MBMS service. The signaling is also used to inform the plurality of UEs of a time to use the ciphering key.

It is also assumed in the following description that the network includes one UE, one UTRAN connected to the UE, one SGSN connected to the UTRAN, and one GGSN connected to the SGSN. However, those skilled in the art will appreciate that the same can be applied to an actual network that includes a plurality of UEs, a UTRAN connected to the UEs, and a plurality of SGSNs and GGSNs connected to the UTRAN.

Referring to FIG. 4, at step 441, the BM-SC 440 or any other element of the CN announces an MBMS service to be provided at a later time on a cell-by-cell basis. The element of the CN responsible for the service announcement may differ depending on service areas or characteristics of the MBMS service.

The UE 400 starts procedures for receiving an MBMS service, which it desires to receive, when it receives a service announcement of the desired MBMS service. At step 401, the UE initiates a joining procedure in which the UE 400 expresses that it desires to receive the MBMS service. In the joining procedure, the UE 400 transmits a joining message toward the BM-SC 440. The joining message may include a UE identification (ID) of the UE 400 and an MBMS ID of the desired MBMS service.

When receiving the joining message, the BM-SC 440 checks the UE and MBMS IDs included in the joining message. Thereafter, the BM-SC 400 performs an authentication procedure to determine whether the UE 400 corresponding to the UE ID is authorized to receive the MBMS service corresponding to the MBMS ID at step 442. If it is determined that it is not appropriate to provide the desired MBMS service to the UE 400, the BM-SC 400 transmits an objection message to the UE 400. However, if it is determined that it is appropriate to provide the desired MBMS service to the UE 400, the BM-SC 400 performs a ciphering procedure associated with the UE 400 at step 443.

The ciphering procedure may include selecting an algorithm for encoding MBMS data to be transmitted to the UE 400, and setting parameters (i.e., ciphering keys) to be used in the algorithm. The ciphering procedure may further include setting a ciphering algorithm to ensure safe transmission of the ciphering key to the UE 400 and another ciphering key for use in encoding the ciphering key. Although the BM-SC 440 performs the ciphering procedure in this description, any other element of the CN can be implemented to perform the ciphering procedure.

When the ciphering procedure is completed, the BM-SC 440 transmits a response message including information produced in the ciphering procedure to the UE 400 at step 444. Preferably, the response message includes a UE ID of the UE 400, an MBMS ID of the MBMS service requested by the UE 400, a first ciphering key and a ciphering algorithm type required to receive the MBMS service, and another ciphering key to ensure safe receipt of the first ciphering key. It is assumed that a ciphering key indicator proposed in the present invention is information indicating a ciphering key for use in encoding MBMS data.

At step 444, the UE 400 receives ciphering information corresponding to an MBMS service desired by the UE 400 from the BM-SC 440. The ciphering information may include a plurality of ciphering keys for use in encoding MBMS data for the MBMS service. The present invention provides a method of determining and indicating which of the ciphering keys is to be used and how information indicating the time to use the selected ciphering key is transmitted to the UE. Accordingly, these features will be described in more detail herein below with reference to FIG. 5, FIGS. 6A and 6B, and FIGS. 7A and 7B.

At step 445, the BM-SC 440 transmits a session start message, indicating when the MBMS requested by the UE 400 is provided, to the GGSN 430. At step 431, the GGSN 430 transmits the session start message to the SGSN 420. At step 421, the SGSN 420 transmits the session start message to the UTRAN 410. At step 412, a corresponding RAN in the UTRAN 410, which is connected to the UE 400, transmits an MBMS notification message to the UE 400. The notification message notifies the UE 400 of when the MBMS service requested by the UE 400 is to be started. The session start message and the notification message have the same function to notify UEs of the time to start using the MBMS service. However, the session start message is used in the CN and the notification message is used in the UTRAN.

After receiving the session start message, the RNC in the UTRAN 410 establishes a path for providing the desired MBMS service to the UE 400. More specifically, at step 411, the RNC establishes an MBMS Radio Access Bearer (RAB) with the BM-SC 440, and at step 413, the RNC sets up an MBMS Radio Bearer (RB) with the UE 400. The RAB may be provided as a logical connection path for data exchange between the UTRAN and the CN, and the RB may be provided as a logical connection path for data exchange between the UE and the UTRAN. That is, data exchange between the UE and the UTRAN is performed through the RB and data exchange between the UTRAN and the CN is performed through the RAB.

Before or after establishing the RAB at step 411, the UTRAN 410 can check how many UEs receive the MBMS service in a cell managed by the UTRAN 410. The type of an RB to be set up in the RB establishment procedure of step 411 can be determined based on the number of UEs that receive the MBMS service. More specifically, if the number of UEs is larger than a reference value predetermined by the UTRAN, an RB for providing MBMS services based on a PtM mode is set up. If the number of UEs is less than or equal to the reference value, an RB for providing MBMS services based on a PtP mode is set up. The reference value can be determined based on the service performance of each cell.

In the description above, the UTRAN 410 requests that the CN establish the RAB, but the CN can also request that the UTRAN 410 establishes the RAB. RAB information for MBMS services can also be included in the session start message so as to be provided to the UTRAN 410. When the RAB information for MBMS services is included in the session start message, an indicator of a ciphering key for use in encoding MBMS data can be included in the session start message or in the RAB information for MBMS services.

After establishing the transmission path for an MBMS service, the CN and the UTRAN 410 begin transmitting MBMS data for the MBMS service and the UE 400 starts receiving the MBMS data at step 446 A ciphering indicator of a ciphering key used to encode the MBMS data can be transmitted through the header of the data frame that carries the MBMS data. When required, the BM-SC 440, the GGSN 430, and the SGSN 420 of the CN regenerate a ciphering key for the MBMS service at step 447. The element of the CN in charge of generating the ciphering key may differ depending on both the algorithm in which the ciphering key is used and the range in which the data to be ciphered is transmitted. In the present invention, it is assumed that the element of the CN in charge of generating the ciphering key is the BM-SC 440.

When it is desired to renew the ciphering key currently in use, the BM-SC 440 generates a new ciphering key at step 447, and transmits the new ciphering key to UEs requiring the new ciphering key through a ciphering key distribution procedure of step 448. For example, the BM-SC 440 generates and transmits a new ciphering key to the SGSN 420. The SGSN 420 establishes a dedicated connection with the UE 400 through the UTRAN 410 to inform the UE 400 of the new ciphering key.

2. Embodiments of Transmission of Information of when Ciphering Key is to be used A detailed description will now be given of three embodiments in which information indicating a new ciphering key to be used and when the new ciphering key is to be used.

Figure 5:
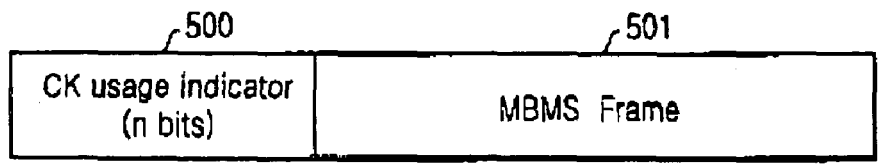
FIG. 5 is a diagram illustrating a structure of an MBMS data frame for application of an embodiment of the present invention.

In a first embodiment, the present invention proposes s a data frame carrying MBMS data to notify a UE of when a ciphering key is to be used. FIG. 5 illustrates an MBMS data frame for application of the first embodiment of the present invention.

Referring to FIG. 5, reference numeral 500 denotes an indicator of a used ciphering key proposed in the present invention. MBMS data 501 has been encrypted using the ciphering key indicated by the indicator 500. An advantage of this embodiment using the MBMS data frame is that the indicator of a ciphering key used to encode MBMS data is transmitted with the MBMS data such that the CN can renew the ciphering key whenever needed. Herein, it is assumed that the renewed ciphering key is already known to the UE. For example, the length of the indicator 500 is n bits, which can be determined based on the type of the ciphering key used to encode the MBMS data.

In the first embodiment, a ciphering key indicator indicates a new ciphering key to be used, and the new ciphering key is to be used when the UE receives the data frame.

Figure 6A:
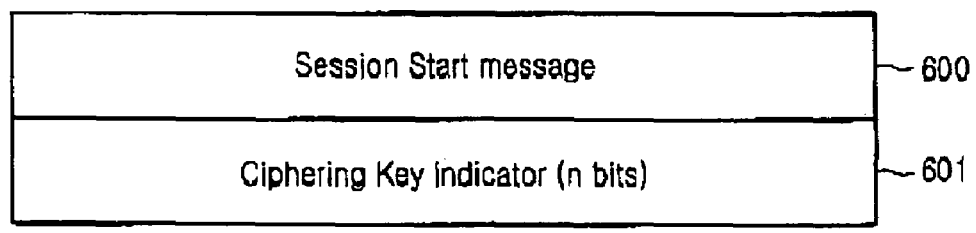
FIGS. 6A and 6B are diagrams illustrating messages for application of an embodiment of the present invention.

In a second embodiment, session start and notification messages are used to notify the UE of when the ciphering key is to be used. FIG. 6A illustrates a session start message for application of the second embodiment of the present invention, and FIG. 6B illustrates an MBMS notification message for application of the second embodiment of the present invention.

Referring to FIG. 6A, reference numeral 600 denotes a session start message used in the prior art, and reference numeral 601 denotes a ciphering key indicator as proposed in the present invention. In FIG. 6B, reference numeral 610 denotes an MBMS notification message as used in the prior art, and reference numeral 611 denotes a ciphering key as proposed in the present invention. The ciphering key indicator indicates a type of a ciphering key for use in encoding MBMS data to be transmitted and indicates when the ciphering key is to be used.

The session start message as configured in FIG. 6A is transmitted between the CN and the UTRAN (see steps 445, 431, and 421 in FIG. 4). The notification message as configured in FIG. 6B is transmitted between the UTRAN and the UE (see step 412 in FIG. 4).

Figure 6B:
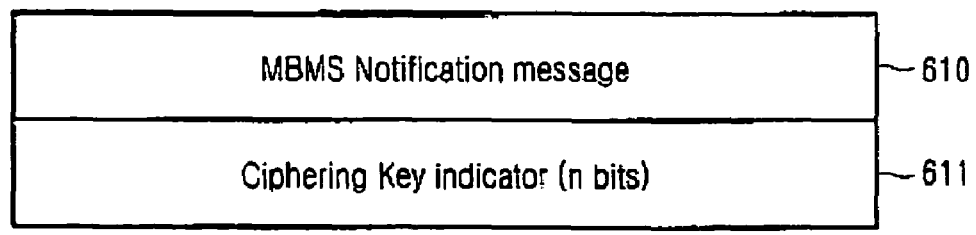

Accordingly, after receiving a session start message as configured in FIG. 6A, the UTRAN produces an MBMS notification message as configured in FIG. 6B and transmits the MBMS notification message 6B to the UE. The session start message as configured in FIG. 6A and the notification message as configured in FIG. 6B may have different functions, but both notify when the MBMS service is to be started.

After receiving the notification message, the UE checks the ciphering key indicator 611 included in the notification message. The UE then selects a ciphering key corresponding to the checked ciphering key indicator and decodes MBMS data, received after the time indicated by the checked indicator, using the selected ciphering key. For example, the length of the indicator 611 indicating the ciphering key is n bits, which can be determined based on the number of ciphering keys for MBMS data and the size of information indicating when the new ciphering key is to be used.

In the second embodiment described above, the ciphering key indicator indicates a new ciphering key to be used, and a time at which the new ciphering key is to be used is determined based on separately provided information.

In a third embodiment, an MBMS RAB establishment response message and an MBMS RB setup message are used to notify the UE of when the ciphering key is to be used. The third embodiment proposes that an information element indicating a ciphering key used to encode MBMS data is added to a message exchanged in the MBMS RAB establishment procedure (step 411 in FIG. 4) and a message exchanged in the MBMS RB establishment procedure (step 413 in FIG. 4).

Figure 7A:
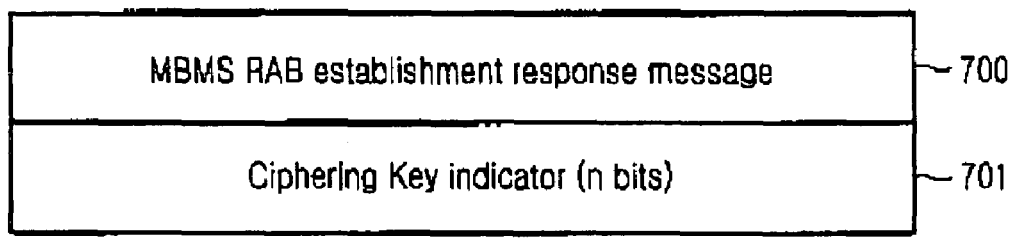
FIGS. 7A and 7B are diagrams illustrating messages for application of an embodiment of the present invention.
Figure 7B:
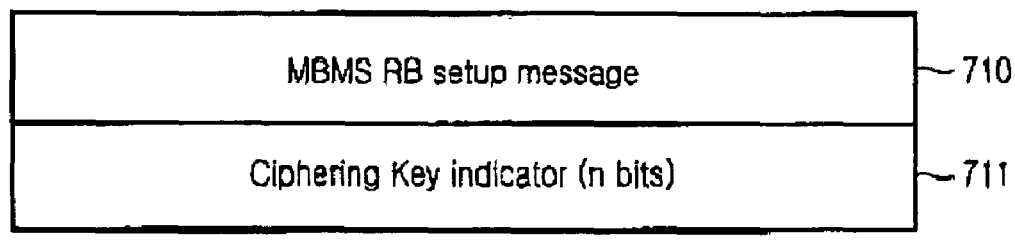

FIG. 7A illustrates an MBMS RAB establishment response message for application of the third embodiment of the present invention and FIG. 7B illustrates an MBMS RB setup message for application of the third embodiment of the present invention. The MBMS RAB establishment response message is transmitted from the CN to the UTRAN in response to an MBMS RAB establishment request message from the UTRAN in the MBMS RAB establishment procedure of step 411 in FIG. 4. The MBMS RB setup message is transmitted from the UTRAN to the UE in the MBMS RB establishment procedure of step 413 in FIG. 4.

In FIG. 7A, reference numeral 700 denotes a conventional MBMS RAB establishment message, and reference numeral 701 denotes an information element representing a ciphering key indicator used to encode MBMS data, as proposed in the present invention. In FIG. 7B, reference numeral 710 denotes a conventional RB setup message and reference numeral 711 denotes an information element representing a ciphering key indicator used to encode MBMS data, as proposed in the present invention. A description of the RAB establishment response message 700 and the RB setup message 710 is omitted herein because they are unrelated to the proposition of the present invention, and details thereof are described in the 3GPP 25.331 specification.

In the third embodiment as described above, the ciphering key indicator indicates a new ciphering key to be used, and a time when the new ciphering key is to be used is determined based on separately provided information.

The essential functions of second and third embodiments are identical. However, the second and third embodiments differ in that they use different messages. In the second embodiment, because the notification message is used, the ciphering key indicator is provided to all UEs in the cell. However, in the third embodiment, because the MBMS RB setup message is used, the ciphering key indicator is provided only to UEs that are to receive the MBMS service. The third embodiment is advantageous in that the ciphering key indicator is transmitted only to UEs for which the ciphering key indicator is necessary.

Additionally, the second and third embodiments can only be applied when a session, which can be a unit of MBMS data transmission, is started or when an RB or RAB for transmitting MBMS data is established. The second and third embodiments are advantageous over the first embodiment in that overhead is small because it is possible to inform UEs of a ciphering key used to encode MBMS data in one or several transmissions.

The following table summarizes advantages of the three embodiments described above.

TABLE 5

| Proposed Methods | Advantages |
| --- | --- |
| To add ciphering key indicator to MBMS data frame (First Embodiment) | 1) Can change ciphering key setting time by CN whenever needed.<br>2) Can be applied even to asynchronous mobile system having no absolute time shared between UEs and CN. |
| To use session start message and notification message to carry ciphering key indicator (Second Embodiment) | 1) Can change ciphering key setting in one transmission.<br>2) Can be applied even to asynchronous mobile system having no absolute time shared between UEs and CN. |
| To use RAB establishment response message and RB setup message to carry ciphering key indicator (Third Embodiment) | 1) Can change ciphering key setting in one transmission.<br>2) Can be applied also to asynchronous mobile system having no absolute time shared between UEs and CN.<br>3) Can transmit ciphering key change information only to UEs requiring it |

New embodiments can also be proposed by combining messages used in the second and third embodiments of the present invention. For example, a combination of the session start message (between the CN and the UTRAN) in FIG. 6A and the MBMS RB setup message (between the UTRAN and the UE) in FIG. 7B or a combination of the MBMS RAB establishment response message (between the CN and the UTRAN) in FIG. 7A and the MBMS notification message (between the UTRAN and the UE) in FIG. 6B can notify the UE of when the new ciphering key is to be used.

3. Operations of Embodiments 3.1. Operation of First Embodiment

Herein below, a detailed description will be given of how the CN and the UE transmit a ciphering key indicator through an MBMS data frame according to the first embodiment of the present invention. When a ciphering key indicator is added to an MBMS data frame according to the first embodiment, the UTRAN operates in almost the same manner as usual because the indicator is added to the application layer. It is assumed in the following description that a 1-bit indicator is used. A number of ciphering keys for use in encoding MBMS data may also be transmitted in response messages to MBMS joining requests of UEs. It is also assumed that a new ciphering key to be used occurs during transmission of MBMS data.

Figure 8:
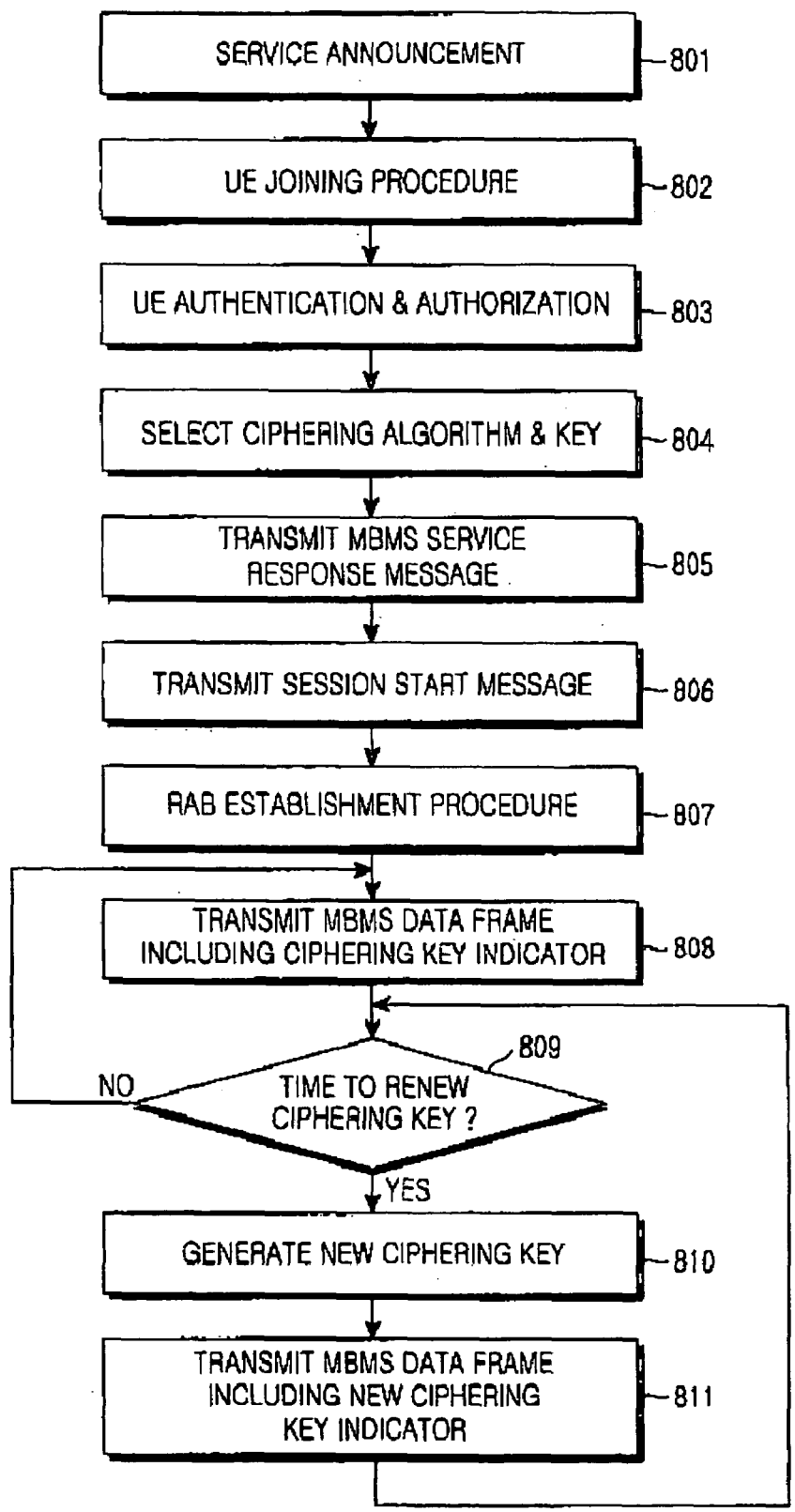
FIG. 8 is a control flow diagram illustrating how a CN operates according to an embodiment of the present invention.
Figure 9:
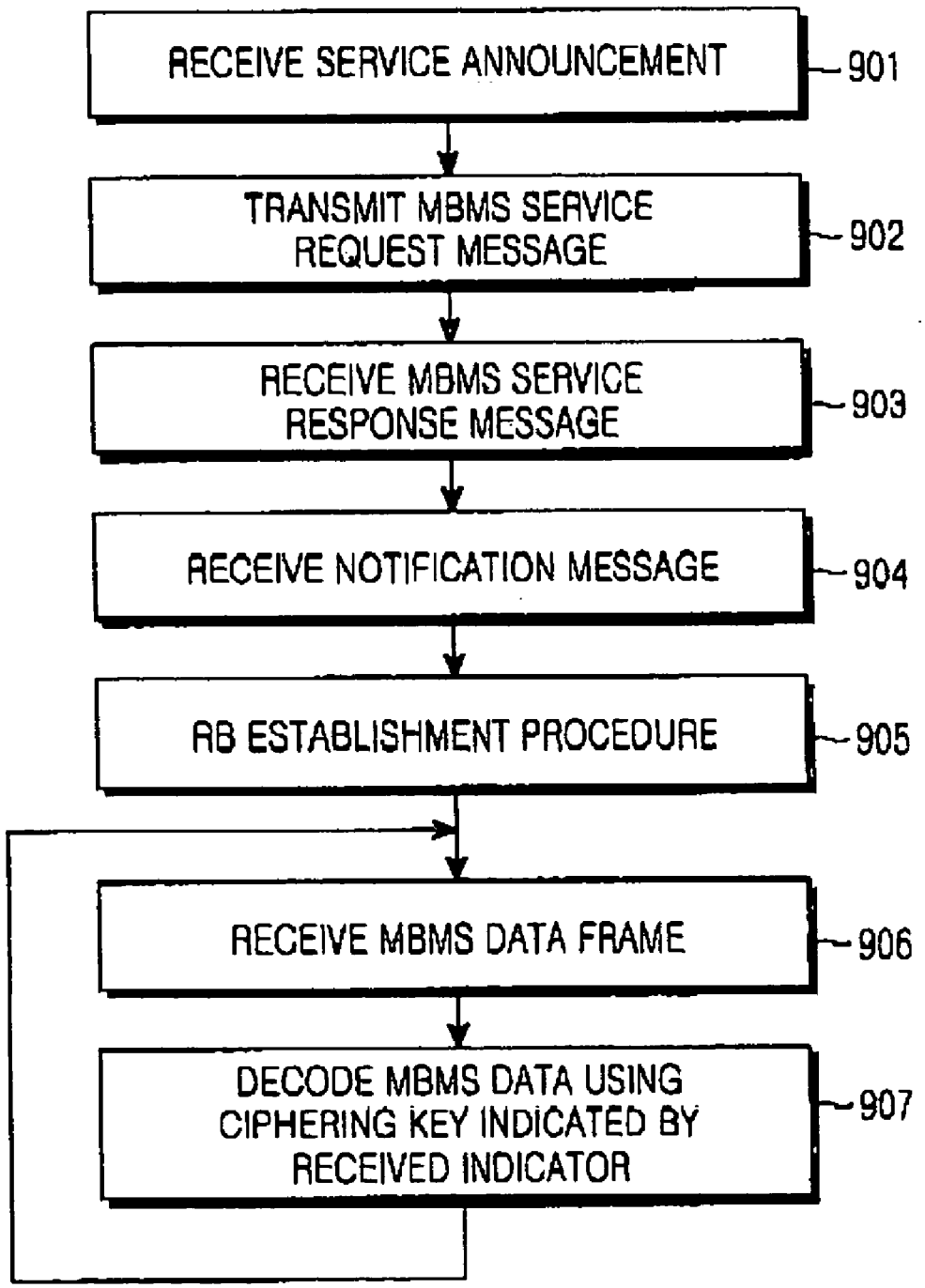
FIG. 9 is a control flow diagram illustrating how a UE operates according to an embodiment of the present invention.

FIG. 8 is a control flow diagram illustrating the CN operations according to the first embodiment of the present invention, and FIG. 9 is a control flow diagram illustrating the UE operations according to the first embodiment of the present invention. As illustrated in FIG. 8, the CN starts service announcement of an MBMS service at step 801. The CN then performs a joining procedure with UEs that desire to receive the announced MBMS service at step 802. The joining procedure is started when the CN receives a joining message (or an MBMS service request message) from the UEs. The joining message (or the MBMS service request message) includes a UE ID of the UE desiring to receive the MBMS service and an MBMS ID of the MBMS service desired by the UE. The joining message is a response message to the service announcement.

At step 803, the CN performs an authentication/authorization procedure for the UEs that have requested the MBMS service. The authentication/authorization procedure is performed to check if the UEs are authorized to receive the MBMS service, e.g., if an MBMS service is part of a subscribers service plan. If the UEs are authorized to receive the MBMS service in the authentication/authorization procedure, at step 804, the CN selects a ciphering algorithm and a ciphering key for use in encoding MBMS data for the MBMS service. At step 805, the CN adds the selected ciphering information to an MBMS service response message and transmits the MBMS service response message to the UEs in response to the MBMS service requests received from the UEs. The ciphering key included in the ciphering information to be transmitted may be encrypted using a method different from that used for the MBMS data.

At step 806, the CN transmits a session start message, indicating that the MBMS service is to be started, to the UTRAN. Then, at step 807, the CN performs an RAB establishment procedure for supporting the MBMS service. The RAB establishment procedure is started when the CN receives an RAB establishment request message from a corresponding RNC of the UTRAN. When the RAB establishment is completed, the CN transmits an RAB establishment response message to the UTRAN in response to the RAB establishment request message.

At step 808, the CN generates and transmits an MBMS data frame including MBMS data encrypted using a ciphering key and an indicator of the ciphering key. At step 809, the CN determines if it is time to renew the ciphering key for use in the MBMS service. If it is determined that it is not time to renew the ciphering key, the CN returns to step 808 to transmit the MBMS data after encrypting it using the existing ciphering key. However, if it is determined that it is time to renew the ciphering key, the CN proceeds to step 810. The ciphering key renewal can be performed at intervals of a predetermined period.

At step 810, the CN generates a new ciphering key. Here, the CN must notify all UEs receiving the MBMS service of the use of the new ciphering key. To accomplish this, the CN generates and transmits an MBMS data frame including an indicator of the new ciphering key at step 811. Thereafter, the new ciphering key is used to encode the MBMS data until the next ciphering key renewal time comes. The CN repeats the steps 808 to 811 until the MBMS service is terminated.

FIG. 9 is a control flow diagram illustrating UE operations according to the first embodiment of the present invention. As illustrated in FIG. 9, the UE receives a service announcement of an MBMS service from the CN at step 901. At step 902, the UE transmits an MBMS service request message requesting the MBMS service to the CN. At step 903, the UE receives an MBMS service response message from the CN in response to the MBMS service request message. The MBMS service response message includes ciphering information for use in encoding MBMS data for the MBMS service.

At step 904, the UE receives an MBMS notification message, indicating that the MBMS service is to be started, from the CN. After receiving the notification message, the UE performs an RB establishment procedure for the MBMS service at step 905. When the RB establishment is completed, the UE receives an MBMS data frame at step 906. The header of the MBMS data frame includes an indicator of a ciphering key for use in the MBMS service.

At step 907, the UE uses a ciphering key indicated by the indicator to decode MB data included in the received data frame. Before decoding the MBMS data, the UE determines whether the ciphering key indicated by the indicator is identical to a ciphering key that has been used. If it is determined that the two ciphering keys are identical, the UE uses the ciphering key that has been used to decode the MBMS data. However, if it is determined that the two ciphering keys are not identical, the UE uses the ciphering key indicated by the indicator, as a new ciphering key, to decode the MBMS data. The CN is responsible for generating and distributing the new ciphering key. The CN is also responsible for determining when the new ciphering key is to be used. The UE continues to receive MBMS data until the MBMS service is terminated.

The distribution of a new ciphering key to be used and the notification of when the new ciphering key is to be used can be performed separately. That is, because a number of UEs are receiving the MBMS service due to characteristics of the MBMS service, the CN can notify the UEs of when a new ciphering key is to be used after sufficient time has passed for all the UEs to receive the new ciphering key.

An asynchronous mobile communication system has no time commonly used by the CN and a number of UEs. Therefore, there is a need to provide a method for notifying UEs of the time to start using the new ciphering key after distribution of the new ciphering key. Without this notification, the new ciphering key may not be used at an appropriate time. If the method proposed in the present invention is used, it is possible to simultaneously notify a plurality of UEs of a ciphering key used to encode MBMS data even in the asynchronous mobile communication system.

3.2. Operation of Second Embodiment

Herein below, a detailed description will be given here of how the CN, the UTRAN, and the UE transmit a ciphering key indicator through a session start message and an MBMS notification message according to the second embodiment of the present invention.

Figure 10:
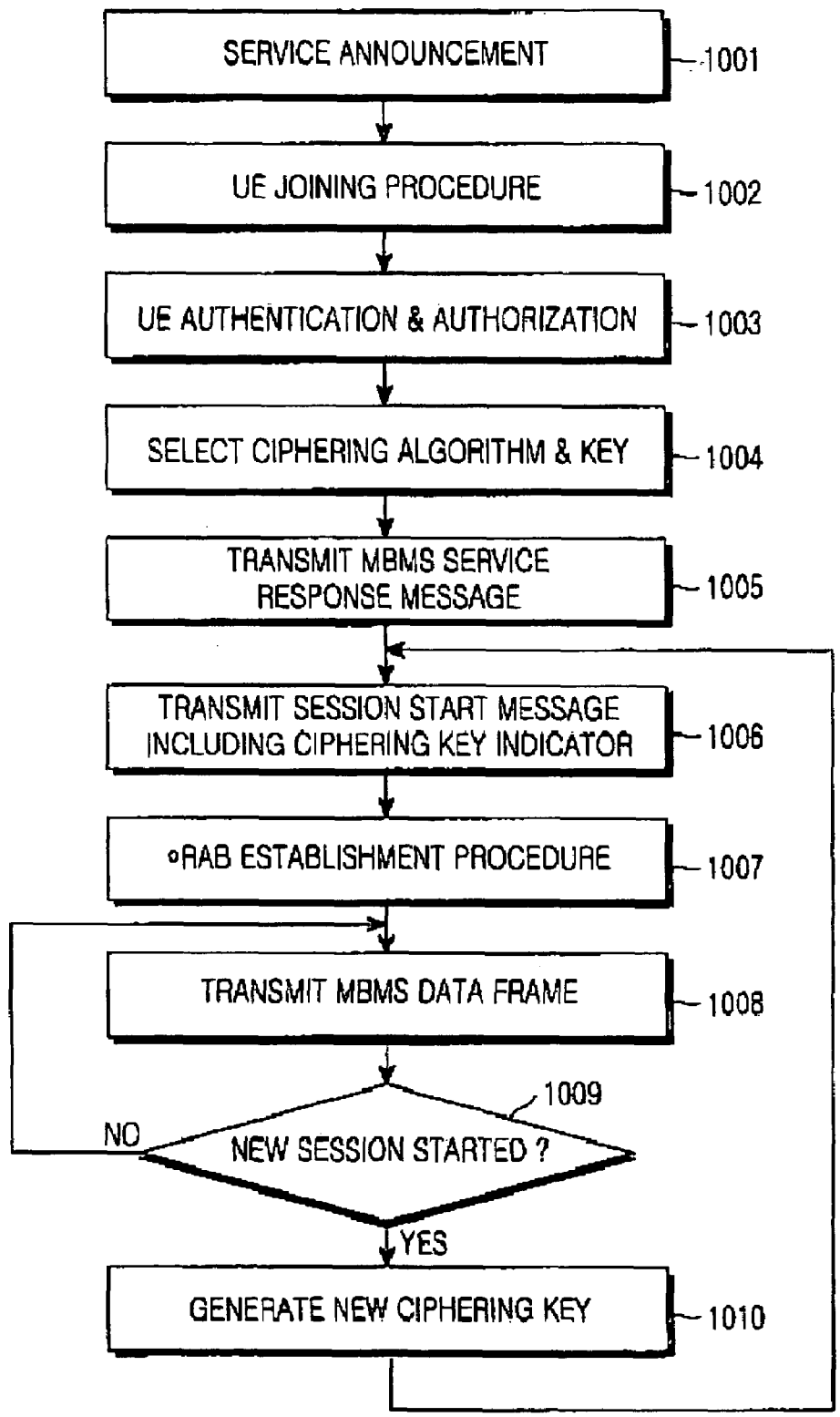
FIG. 10 is a control flow diagram illustrating how the CN operates according to an embodiment of the present invention.

FIG. 10 is a control flow diagram illustrating CN operations according to the second embodiment of the present invention. As illustrated in FIG. 10, the CN starts service announcement of an MBMS service at step 1001. At step 1002, the CN performs a joining procedure with UEs that desire to receive the announced MBMS service. The joining procedure is started when the CN receives a joining message (or an MBMS service request message) from the UEs. The joining message (or the MBMS service request message) includes a UE ID of the UE desiring to receive the MBMS service and an MBMS ID of the MBMS service desired by the UE. The joining message is a response message to the service announcement.

At step 1003, the CN performs an authentication/authorization procedure for the UEs that have requested the MBMS service. The authentication/authorization procedure is performed to determine if the UEs are authorized to receive the MBMS service. Only when the UEs are authorized to receive the MBMS service in the authentication/authorization procedure, the CN moves to step 1004 to select a ciphering algorithm and a ciphering key for use in encoding MBMS data for the MBMS service. At step 1005, the CN adds the selected ciphering information to an MBMS service response message and transmits the MBMS service response message to the UEs in response to the MBMS service requests received from the UEs. The ciphering key included in the ciphering information to be transmitted may be encrypted using a method different from that used for the MBMS data.

At step 1006, the CN transmits a session start message, indicating that the MBMS service is to be started, to the UTRAN. Here, the session start message includes an indicator of a ciphering key for use in encoding MBMS data. An example of the session start message is illustrated in FIG. 6A.

At step 1007, the CN performs an RAB establishment procedure for supporting the MBMS service. The RAB establishment procedure is started when the CN receives an RAB establishment request message from a corresponding RNC of the UTRAN. When the RAB establishment is completed, the CN transmits an RAB establishment response message to the UTRAN in response to the RAB establishment request message.

At step 1008, the CN encodes MBMS data using a ciphering key indicated by the indicator transmitted through the session start message, and transmits the encoded MBMS data through an MBMS data frame. At step 1009, while transmitting the MBMS data, the CN determines if a new session is started after the existing session is terminated. If a new session is not started, the CN returns to step 1008 to continue to transmit MBMS data using the existing ciphering key. If a new session is not started after the existing session is terminated, the CN terminates all operations for transmitting MBMS data. If a new session is started after the existing session is terminated, the CN proceeds to step 1010 to generate a new ciphering key.

Thereafter, at step 1006, CN transmits a session start message including an indicator of the new ciphering key. The CN uses the new ciphering key to encode MBMS data until another session is started. The CN continues to transmit MBMS data until the MBMS service is terminated.

As described above, a new ciphering key is used for each session in the second embodiment of the present invention. In the description above of FIG. 10, it is assumed that all ciphering keys required to encode the MBMS data are generated at step 1004. However, if the ciphering keys generated at step 1004 are not sufficient, the CN may generate and transmit new ciphering keys to UEs receiving the MBMS service.

Figure 11:
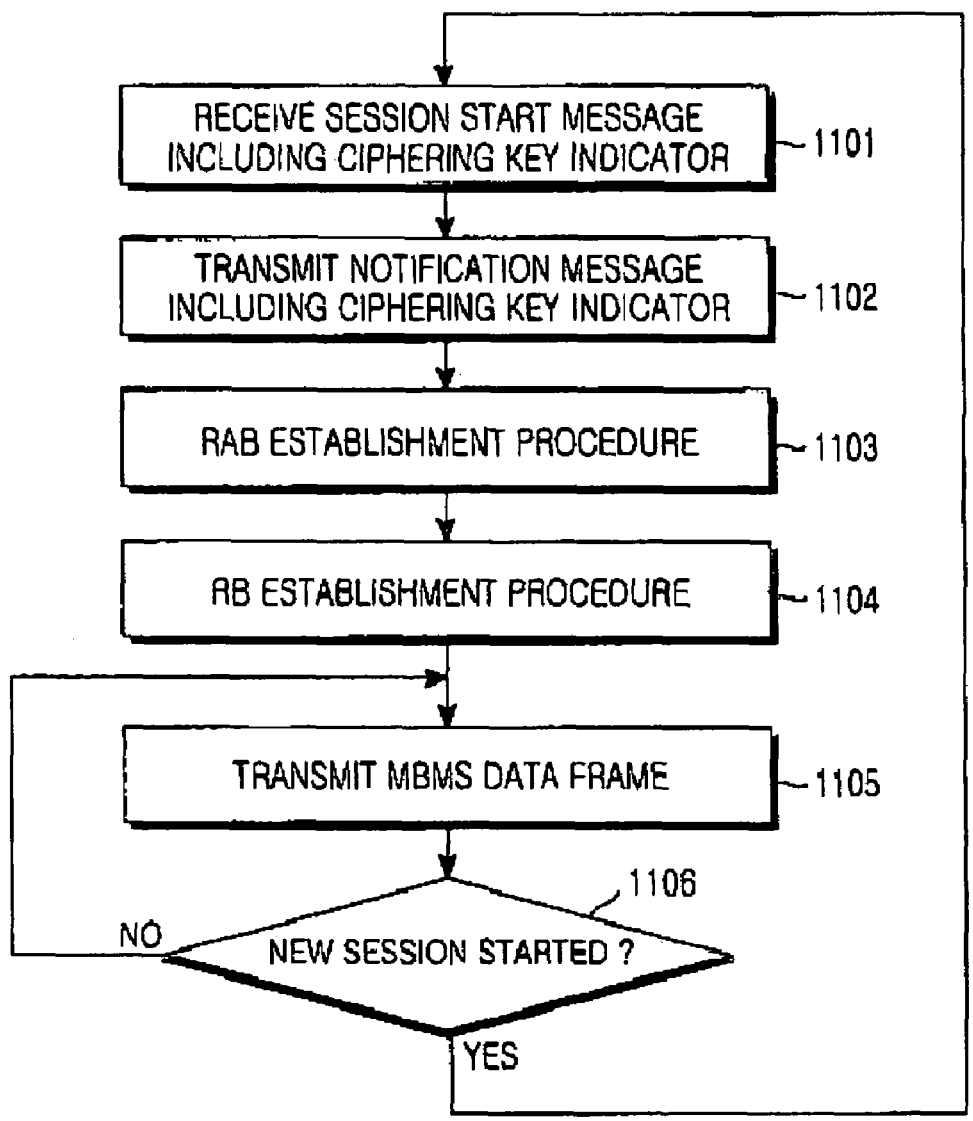
FIG. 11 is a control flow diagram illustrating how a UTRAN operates according to an embodiment of the present invention.

FIG. 11 is a control flow diagram illustrating UTRAN operations according to the second embodiment of the present invention. As illustrated in FIG. 11, at step 1101, the UTRAN receives a session start message from the CN. The session start message includes an indicator of a ciphering key for use in encoding MBMS data at a later time. At step 1102, the UTRAN generates and transmits an MBMS notification message including the indicator to UEs that are to receive the MBMS service.

Thereafter, at step 1103, the UTRAN performs an RAB establishment procedure for supporting the MBMS service. The RAB establishment procedure is started when a corresponding RNC of the UTRAN transmits an RAB establishment request message to the CN. When the RAB establishment with the CN is completed, the UTRAN receives an RAB establishment response message from the CN in response to the RAB establishment request message. At step 1104, the UTRAN performs an RB establishment procedure for supporting the MBMS service. The RB establishment procedure is started when the UTRAN transmits an MBMS RB setup message to UEs that are to receive the MBMS service. After setting up the RB with the UEs, the UTRAN starts transmitting an MBMS data frame received from the CN at step 1105.

While transmitting the MBMS data frame, the UTRAN determines if a new session is started, after the existing session is terminated at step 1106. If a new session is not started, the UTRAN returns to step 1105 to continue to transmit the MBMS data frame using the existing ciphering key. If a new session is not started after the existing session is terminated, the UTRAN terminates all operations for transmitting the MBMS data frame. If a new session is started after the existing session is terminated, the UTRAN returns to step 1101 to receive a session start message including an indicator of a new ciphering key. Thereafter, the UTRAN repeats steps 1102 to 1105 until another session is started. The UTRAN continues to transmit MBMS data until the MBMS service is terminated.

Figure 12:
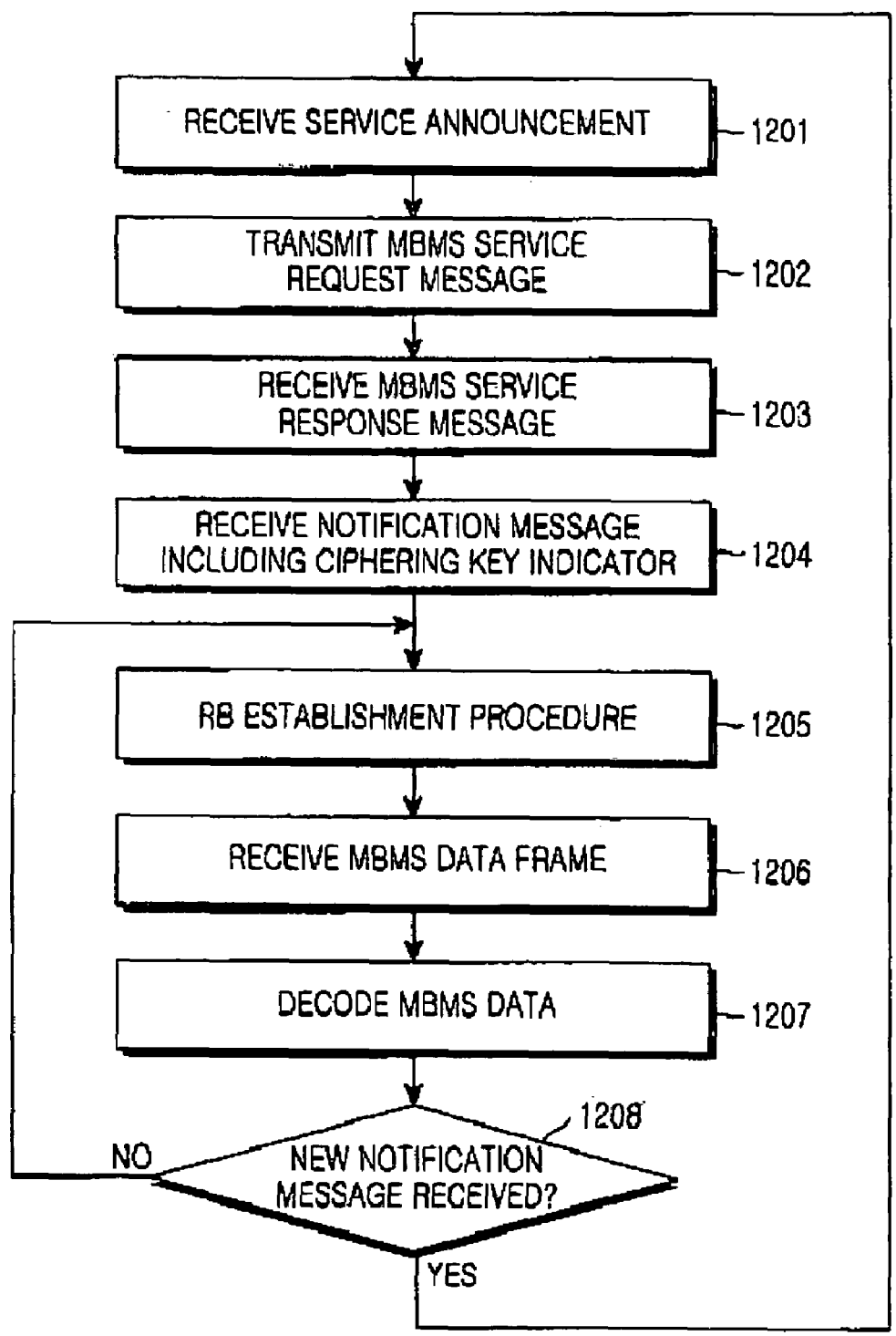
FIG. 12 is a control flow diagram illustrating how the UE operates according to an embodiment of the present invention.

FIG. 12 is a control flow diagram illustrating UE operations according to the second embodiment of the present invention. As illustrated in FIG. 12, the UE receives a service announcement of an MBMS service from the CN at step 1201. At step 1202, the UE transmits an MBMS service request message requesting the MBMS service to the CN. At step 1203, the UE receives an MBMS service response message from the CN in response to the MBMS service request message. The MBMS service response message includes ciphering information for use in encoding MBMS data for the MBMS service.

At step 1204, the UE receives an MBMS notification message, indicating that the MBMS service is to be started, from the UTRAN. The notification message includes an indicator of a ciphering key for use in decoding MBMS data at a later time.

After receiving the notification message, the UE performs an RB establishment procedure for the MBMS service at step 1205. When the RB establishment is completed, the UE receives an MBMS data frame at step 1206. At step 1207, the UE uses a ciphering key indicated by the indicator received through the notification message to decode MB data included in the received data frame.

While receiving the MBMS data frame, the UE determines if a new MBMS notification message is received as a new session is started after the existing session is terminated at step 1208. If a new MBMS notification message is not received, the UE moves to step 1205 and the UE decodes the received MBMS data using the existing ciphering key (1206 and 1207). If a new MBMS notification message is received, the UE moves to step 1201. That is, the UE uses the existing ciphering key before a new MBMS notification message is received, and replaces the existing ciphering key with a new ciphering key when the new MBMS notification message is received. The UE continues to receive MBMS data until the MBMS service is terminated.

3.3. Operation of Third Embodiment

Herein below, a detailed description will be given the CN, the UTRAN, and the UE operations for transmitting a ciphering key indicator through an MBMS RAB establishment message and an MBMS RB setup message according to the third embodiment of the present invention. The third embodiment, which will be described in FIGS. 13 to 15, can also be applied when the transmission mode is switched from the PtP to PtM modes or from the PtM to PtP modes.

Figure 13:
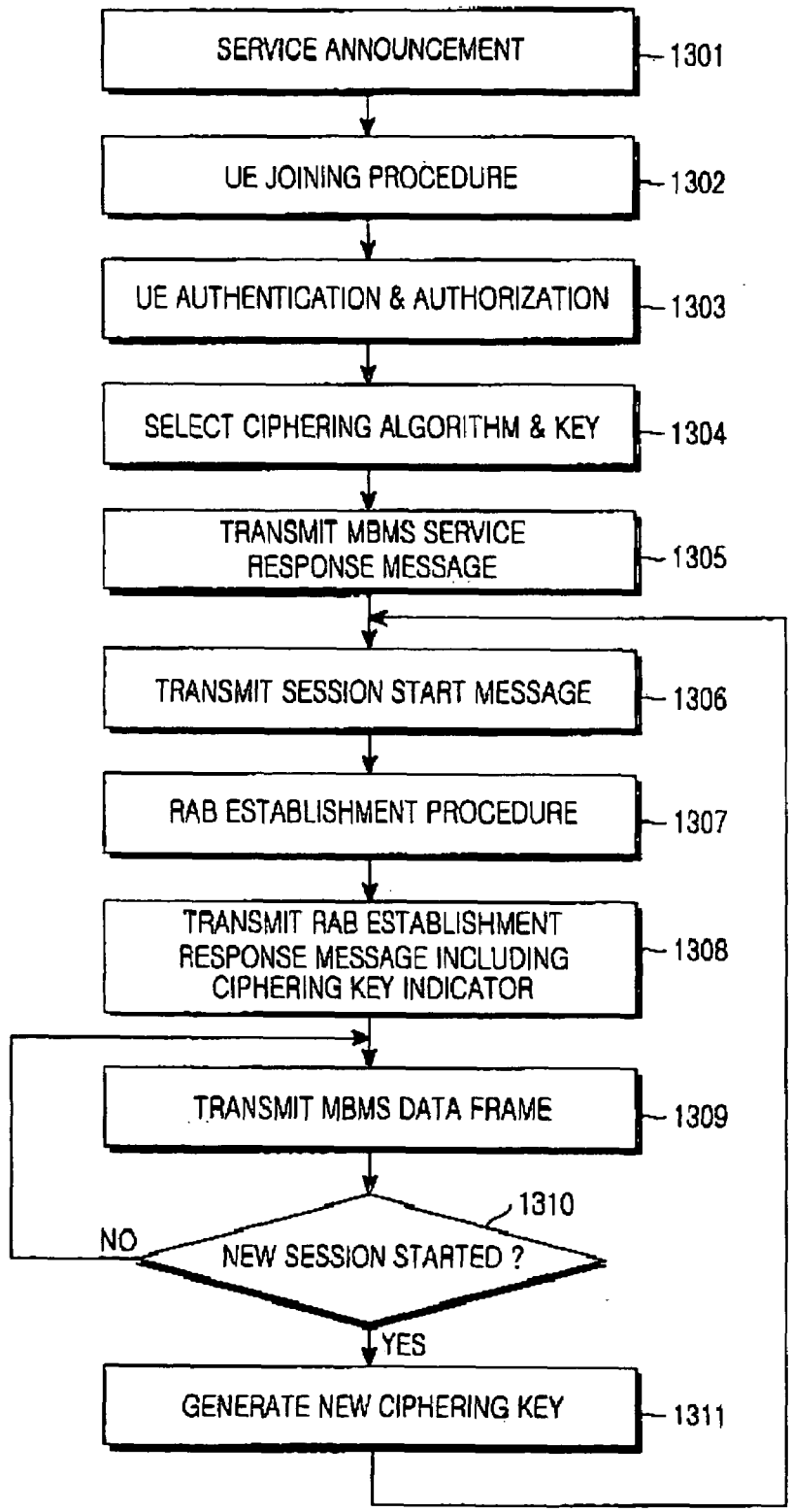
FIG. 13 is a control flow diagram illustrating how the CN operates according to an embodiment of the present invention.

FIG. 13 is a control flow diagram illustrating CN operations according to the third embodiment of the present invention. As illustrated in FIG. 13, the CN starts service announcement of an MBMS service at step 1301. At step 1302, the CN performs a joining procedure with UEs that desire to receive the announced MBMS service. The joining procedure is started when the CN receives a joining message (or an MBMS service request message) from the UEs. The joining message (or the MBMS service request message) includes a UE ID of the UE desiring to receive the MBMS service and an MBMS ID of the MBMS service desired by the UE. The joining message is a response message to the service announcement.

At step 1303, the CN performs an authentication/authorization procedure for the UEs that have requested the MBMS service. The authentication/authorization procedure is performed to determine if the UEs are authorized to receive the MBMS service. Only when the UEs are authorized to receive the MBMS service in the authentication/authorization procedure, the CN moves to step 1304 to select a ciphering algorithm and a ciphering key for use in encoding MBMS data for the MBMS service.

At step 1305, the CN adds the selected ciphering information to an MBMS service response message and transmits the MBMS service response message to the UEs in response to the MBMS service requests received from the UEs. The ciphering key included in the ciphering information to be transmitted may be encrypted using a method different from that used for the MBMS data.

At step 1306, the CN transmits a session start message, indicating that the MBMS service is to be started, to the UTRAN. At step 1307, the CN performs an RAB establishment procedure for supporting the MBMS service. The RAB establishment procedure is started when the CN receives an RAB establishment request message from a corresponding RNC of the UTRAN. When the RAB establishment is completed, the CN transmits an RAB establishment response message to the UTRAN in response to the RAB establishment request message at step 1308. Herein, the RAB establishment response message includes an indicator of a ciphering key for use in encoding MBMS data. An example of the RAB establishment response message has been illustrated in FIG. 7A.

At step 1309, the CN encodes MBMS data using a ciphering key indicated by the indicator transmitted through the RAB establishment response message, and transmits the encoded MBMS data through an MBMS data frame.

At step 1310, while transmitting the MBMS data, the CN determines if a new session is started, after the existing session is terminated. If a new session is not started, the CN returns to step 1309 to continue to transmit MBMS data using the existing ciphering key. If a new session is not started after the existing session is terminated, the CN terminates all operations for transmitting MBMS data. If a new session is started after the existing session is terminated, the CN proceeds step 1311 to generate a new ciphering key.

Thereafter, the CN then returns to step 1306 to transmit a session start message. The CN performs an RAB establishment procedure for a new session at step 1307, and transmits an RAB establishment response message including an indicator of the new ciphering key at step 1308. Accordingly, the CN uses the new ciphering key to encode MBMS data until another session is started. The CN continues to transmit MBMS data until the MBMS service is terminated.

As described above, a new ciphering key is used for each RAB establishment in the third embodiment of the present invention. In the above description of FIG. 13, it is assumed that all ciphering keys required to encode the MBMS data are generated at step 1304. However, if the ciphering keys generated at step 1304 are not sufficient, the CN may generate and transmit new ciphering keys to UEs receiving the MBMS service.

Figure 14:
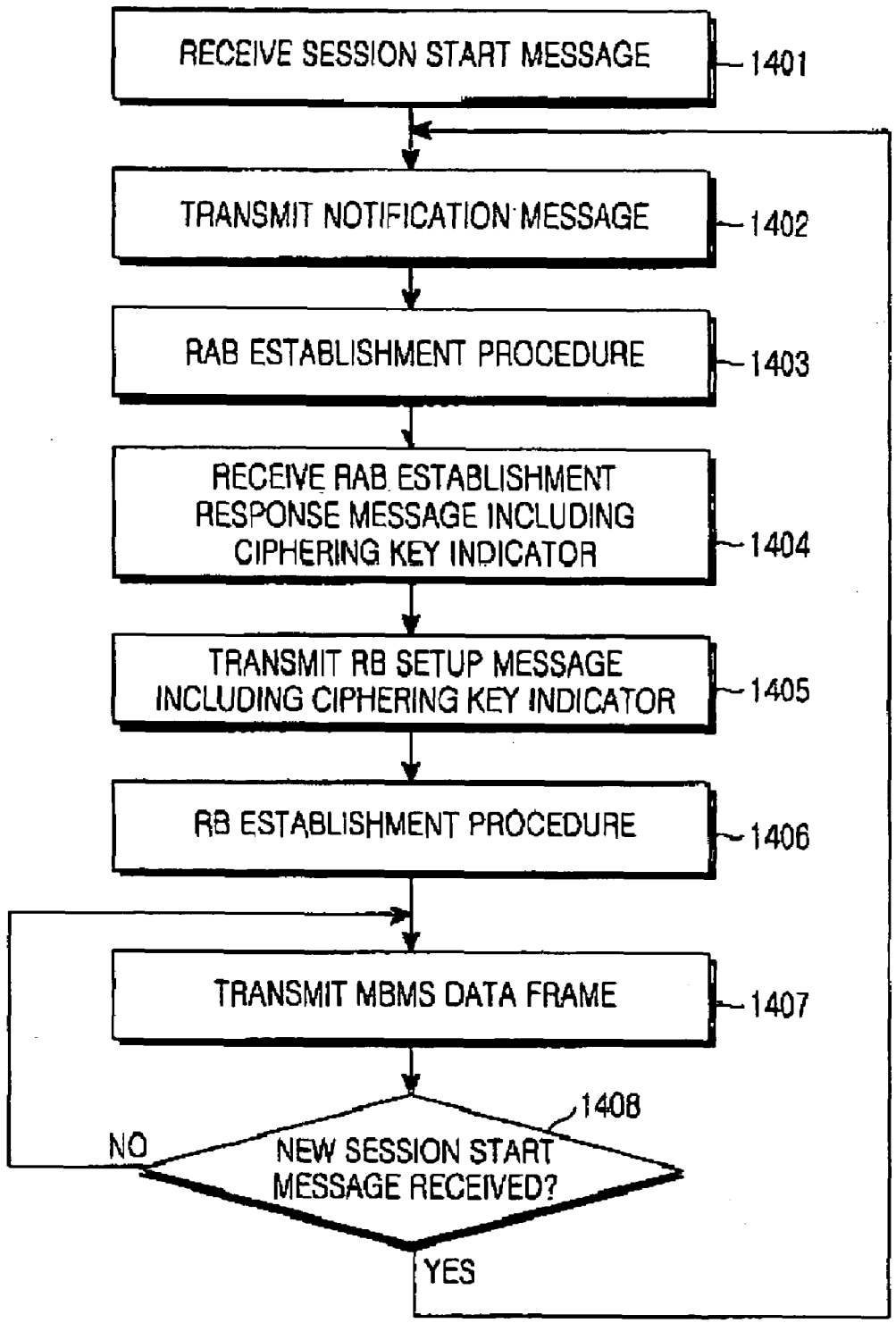
FIG. 14 is a control flow diagram illustrating how the UTRAN operates according to an embodiment of the present invention.

FIG. 14 is a control flow diagram illustrating UTRAN operations according to the third embodiment of the present invention. As illustrated in FIG. 14, at step 1401, the UTRAN receives a session start message from the CN. At step 1402, the UTRAN transmits an MBMS notification message to UEs that are to receive the MBMS service. At step 1403, the UTRAN performs an RAB establishment procedure for supporting the MBMS service after transmitting an RAB establishment request message to the CN. When the RAB establishment procedure is completed, the UTRAN receives an RAB establishment response message from the CN in response to the RAB establishment request message at step 1404. The RAB establishment response message includes an indicator of a ciphering key for use in encoding MBMS data.

At step 1405, the UTRAN transmits an RB setup message including the indicator to UEs that are to receive the MBMS service. Then, the UTRAN performs an RB establishment procedure at step 1406.

At step 1407, the UTRAN encodes MBMS data using a ciphering key indicated by the indicator and transmits the MBMS data to the UEs. At step 1408, while transmitting the MBMS data, the UTRAN determines if a new session start message is received as the current session is terminated. If a new session start message for the MBMS service is received, the UTRAN returns to step 1402. In this case, after providing an indicator of a new ciphering key to the UEs, the UTRAN encodes MBMS data using the ciphering key indicated by the indicator and transmits the MBMS data to the UEs.

However, if a new session start message for the MBMS service is not received, the UTRAN returns to step 1407 to continue transmit MBMS data using the existing ciphering key. If a new session start message is not received although the existing session is terminated, the UTRAN terminates all operations for the MBMS service.

Figure 15:
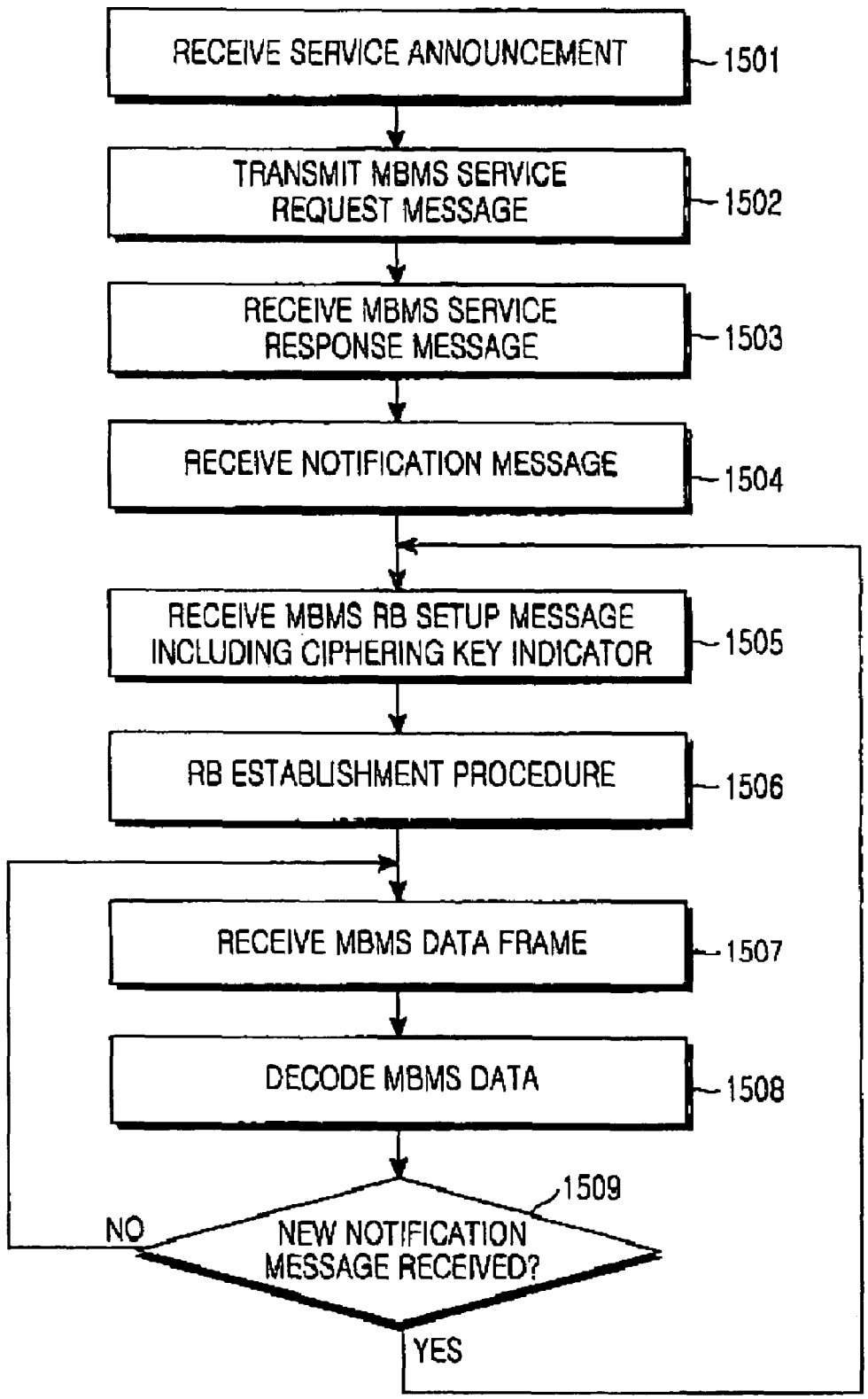
FIG. 15 is a control flow diagram illustrating how the UE operates according to an embodiment of the present invention.

FIG. 15 is a control flow diagram illustrating UE operations according to the third embodiment of the present invention. For a better understanding of the present invention, it is assumed in the following description of FIG. 15 that the RB and RAB establishment procedures are performed each time an MBMS session is started. It is also assumed that there is no transmission mode switching from PtP to PtM modes or from PtM to PtP modes during transmission of MBMS data for the MBMS service.

Referring to FIG. 15, the UE receives a service announcement of an MBMS service from the CN at step 1501. At step 1502, the UE transmits an MBMS service request message requesting the MBMS service to the CN. At step 1503, the UE receives an MBMS service response message in response to the MBMS service request message. The MBMS service response message includes ciphering information for use in encoding MBMS data for the MBMS service.

At step 1504, the UE receives an MBMS notification message, indicating that the MBMS service is to be started, from the UTRAN. After receiving the notification message, the UE receives an RB setup message requesting an RB establishment procedure for the MBMS service at step 1505. The RB setup message includes an indicator of a ciphering key for use in decoding MBMS data at a later time.

The UE receives an MBMS data frame at step 1507 after the RB establishment is competed through the RB establishment procedure at step 1506. At step 1508, the UE uses a ciphering key indicated by the indicator received through the RB setup message to decode MB data included in the received data frame.

While receiving the MBMS data frame, the UE determines if a new MBMS notification message is received as a new session is started after the existing session is terminated at step 1509. If a new MBMS notification message is not received, the UE returns to steps 1507 and 1508 to decode the received MBMS data using the existing ciphering key. However, if a new MBMS notification message is received, the UE returns to step 1505. The UE then decodes the received MBMS data using a ciphering key indicated by a new indicator received through a new RB establishment message, by repeating steps 1505 to 1508. That is, the UE uses the existing ciphering key before a new RB setup message is received, and replaces the existing ciphering key with a new ciphering key when the new RB setup message is received. The UE continues to receive MBMS data until the MBMS service is terminated.

As is apparent from the description above, the present invention provides a ciphering method in a mobile communication system supporting MBMS services, which has a number of advantages. For example, after a ciphering key for use in encoding MBMS data is provided to a UE, the UE is informed of the time to start using the ciphering key. This ensures safe provision of an MBMS service to authorized UEs and prevents the MBMS service from being provided to unauthorized UEs, thereby improving the efficiency of the MBMS service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting data for a broadcast service from a Core Network (CN) in a mobile communication system including the CN for providing broadcast services, at least one Universal Mobile Telecommunications System (UMTS) Terrestrial Radio Access Network (UTRAN) connected to the CN, and at least one User Equipment (UE) for receiving broadcast services through the UTRAN, the method comprising the steps of:
   transmitting a plurality of ciphering keys, which are generated for encoding data for the broadcast service, to the at least one UE wherein the plurality of ciphering keys are transmitted to the at least one UE through a broadcast service response message;
   generating a data frame including data encoded using a ciphering key selected from the plurality of the ciphering keys; and
   transmitting a ciphering key indicator of the selected ciphering key to the at least one UE by incorporating the ciphering key indicator into header information of the generated data frame,
   wherein the ciphering key used to encode the data is changed at intervals of a predetermined period.

2. The method according to claim 1, further comprising the step of:
   if the ciphering key used to encode the data for the broadcast service is changed, transmitting a ciphering key indicator of a changed ciphering key by incorporating the changed ciphering key indicator into the header information of the data frame.

3. The method according to claim 1, wherein, the broadcast service is a Multimedia Broadcast/Multicast Service (MBMS) service.

4. A method of receiving data for a broadcast service by at least one User Equipment (UE) in a mobile communication system including a Core Network (CN) for providing broadcast services, at least one Universal Mobile Telecommunications System (UMTS) Terrestrial Radio Access Network (UTRAN) connected to the CN, and the at least one UE for receiving the broadcast service through the UTRAN, the method comprising the steps of:
   requesting the broadcast service from the CN wherein the broadcast service is a Multimedia Broadcast/Multicast Service (MBMS) service;
   receiving a plurality of ciphering keys for encoding data for the broadcast service from the CN, through a broadcast service response message in response to the request;
   checking a ciphering key indicator included in header information of a data frame received for the broadcast service; and
   decoding data received through the data frame using the ciphering key indicated by the ciphering key indicator,
   wherein the ciphering key is used to encode the data is changed at intervals of a predetermined period.

5. The method according to claim 4, wherein the ciphering key indicator included in the header information of the data frame is changed at intervals of a predetermined period.

6. A method of transmitting data for a broadcast service from a Core Network (CN) in a mobile communication system including the CN for providing broadcast services, at least one Universal Mobile Telecommunications System (UMTS) Terrestrial Radio Access Network (UTRAN) connected to the CN, and at least one User Equipment (UE) for receiving the broadcast services through the UTRAN, the method comprising the steps of:
   transmitting a plurality of ciphering keys generated for encoding data for the broadcast service to the at least one UE wherein the plurality of ciphering keys are transmitted to the at least one UE through a broadcast service response message in response to a broadcast service reciuest of the UE;
   transmitting a ciphering key indicator of a ciphering key selected from the plurality of ciphering keys for use in encoding the data to the at least one UE through the UTRAN by incorporating the ciphering key indicator into a message indicating that the broadcast service is to be staffed; and
   transmitting the data for the broadcast service encoded using the ciphering key indicated by the selected ciphering key indicator to the at least one UE,
   wherein the ciphering key used to encode the data is changed at intervals of a predetermined period.

7. The method according to claim 6, wherein the message indicating that the broadcast service is to be started is a session start message.

8. The method according to claim 6, further comprising the steps of:
   changing the ciphering key when a new session is started; and
   transmitting a ciphering key indicator of the changed ciphering key by incorporating the changed ciphering key indicator into a session start message indicating that the new session is started.

9. The method according to claim 6 wherein the broadcast service is a Multimedia Broadcast/Multicast Service (MBMS) service.

10. The method according to claim 6, further comprising the steps of;
    receiving, by the UTRAN, a ciphering key indicator of a ciphering key for encoding the data through a session start message from the CN, and
    transmitting, by the UTRAN, the ciphering key indicator to the at least one UE by incorporating the ciphering key indicator into a notification message.

11. A method of receiving data for a broadcast service by at least one User Equipment (UE) in a mobile communication system including a Core Network (CN) for providing broadcast services, at least one Universal Mobile Telecommunications Systems (UMTS) Terrestrial Radio Access Network (UTRAN) connected to the CN, and the at least one UE for receiving the broadcast services through the UTRAN, the method comprising the steps of:
    requesting the broadcast service from the CN wherein the broadcast service is a Multimedia Broadcast/Multicast Service (MBMS) service;
    receiving a plurality of ciphering keys for encoding data for the broadcast service from the CN, through a broadcast service response message in response to the request;
    receiving a ciphering key indicator of a ciphering key for encoding the data among the plurality of ciphering keys from the UTRAN through a message indicating that the broadcast service is to be started; and decoding data received from the CN using the ciphering key indicated by the ciphering key indicator,
wherein the ciphering key used to encode the data is changed at intervals of a predetermined period.

12. The method according to claim 11, wherein the message indicating that the broadcast service is to be started is a notification message.

13. The method according to claim 11, further comprising the step of:
receiving a new ciphering key indicator through a notification message transmitted from the UTRAN when a new session is started.

14. A method of transmitting data for a broadcast service from a Core Network (CN) in a mobile communication system including the CN for providing broadcast services, at least one Universal Mobile Telecommunications System (UMTS) Terrestrial Radio Access Network (UTRAN) connected to the CN, and at least one User Equipment (UE) for receiving the broadcast services through the UTRAN, the method comprising the steps of:
transmitting a plurality of ciphering keys generated for encoding data for the broadcast service to UEs that have requested the broadcast service wherein the plurality of ciphering keys are transmitted to the at least one UE through a broadcast service response message;
establishing a Radio Access Bearer (RAB) with the UTRAN;
transmitting a ciphering key indicator of a ciphering key selected from the plurality of ciphering keys for encoding the data by incorporating the ciphering key indicator into a response message associated with the establishment of the RAB; and
transmitting the data for the broadcast service that is encoded using the ciphering key indicated by the ciphering key indicator;
wherein the plurality of ciphering keys are transmitted to the at least one UE through a broadcast service response message in response to a broadcast service request of the UE.

15. The method according to claim 14, further comprising the steps of:
changing the ciphering key when a new session is started; and
transmitting a ciphering key indicator of the changed ciphering key by incorporating the changed ciphering key indicator into a response message associated with an established RAB established when the new session is started.

16. The method according to claim 14, wherein the broadcast service is a Multimedia Broadcast/Multicast Service (MBMS) service.

17. The method according to claim 16, further comprising the steps of:
receiving, by the UTRAN, the ciphering key indicator of a ciphering key for encoding the data from the CN through a response message associated with establishment of the RAB with the CN wherein the ciphering key used to encode the data is changed at intervals of a predetermined period;
transmitting, by the UTRAN, the ciphering key indicator to the at least one UE by incorporating the ciphering key indicator into a Radio Bearer (RB) setup request message; and
transmitting, by the UTRAN, the data encoded using the ciphering key indicated by the ciphering key indicator to the at least one UE wherein the broadcast service is a Multimedia Broadeast/Multicast Service (MBMS) service.

18. A method of receiving data for a broadcast service by at least one User Equipment (UE) in a mobile communication system including a Core Network (CN) for providing broadcast services, at least one Universal Mobile Telecommunications System (UMTS) Terrestrial Radio Access Network (UTRAN) connected to the CN, and the at least one UE for receiving the broadcast services through the UTRAN, the method comprising the steps of:
transmitting a broadcast service request message to the CN wherein the broadcast service is a Multimedia Broadeast/Multicast Service (MBMS) service;
receiving a plurality of ciphering keys for use in encoding the data from the CN through a broadcast service response message;
receiving a ciphering key indicator of a ciphering key selected from the plurality of ciphering keys for use in encoding the data from the UTRAN through a Radio Bearer (RB) setup request message, wherein the ciphering key used to encode the data is changed at intervals of a predetermined period;
setting up an RB with the UTRAN;
receiving a new ciphering key indicator from the UTRAN through an RB setup request message; and
decoding data received through the UTRAN from the CN using the ciphering key indicated by the ciphering key indicator,
wherein the plurality of ciphering keys are transmitted to the at least one UE though a broadcast service response message in response to a broadcast service request of the UE.

19. The method according to claim 18 further comprising the step of:
receiving the new ciphering key indicator of a ciphering key changed when a new session is started.

* * * * *